US008065448B2

(12) United States Patent
Kawahara

(10) Patent No.: US 8,065,448 B2
(45) Date of Patent: Nov. 22, 2011

(54) DMA CONTROL SYSTEM, PRINTING APPARATUS, TRANSFER INSTRUCTION METHOD AND COMPUTER READABLE MEDIUM

(75) Inventor: Takumi Kawahara, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 247 days.

(21) Appl. No.: 12/323,690

(22) Filed: Nov. 26, 2008

(65) Prior Publication Data

US 2009/0287858 A1 Nov. 19, 2009

(30) Foreign Application Priority Data

May 15, 2008 (JP) ................................. 2008-128832

(51) Int. Cl.
*G06F 13/28* (2006.01)
*G06F 13/00* (2006.01)
*G06F 13/14* (2006.01)

(52) U.S. Cl. ................. 710/22; 710/23; 710/33; 710/34; 710/35; 710/59

(58) Field of Classification Search ........................ None
See application file for complete search history.

(56) References Cited

U.S. PATENT DOCUMENTS

| | | | | |
|---|---|---|---|---|
| 5,388,237 | A * | 2/1995 | Sodos | 710/22 |
| 5,805,927 | A * | 9/1998 | Bowes et al. | 710/23 |
| 5,809,335 | A * | 9/1998 | Kamiya | 710/22 |
| 6,128,674 | A * | 10/2000 | Beukema et al. | 710/23 |
| 2004/0093439 | A1 * | 5/2004 | Miura et al. | 710/22 |
| 2005/0198370 | A1 * | 9/2005 | Miller et al. | 709/238 |
| 2009/0287858 | A1 * | 11/2009 | Kawahara | 710/22 |

FOREIGN PATENT DOCUMENTS

| | | |
|---|---|---|
| JP | 09-259071 A | 10/1997 |
| JP | 11-143812 A | 5/1999 |
| JP | 2005-258509 A | 9/2005 |
| JP | 2006-277363 A | 10/2006 |
| JP | 2007-249635 A | 9/2007 |

OTHER PUBLICATIONS

Japanese Patent Office Action issued in application No. 2008-128832 dated Jan. 26, 2010.
Japanese Office Action issued Aug. 10, 2010, in corresponding Japanese Patent Application 2008-128832.

* cited by examiner

*Primary Examiner* — Tanh Nguyen
(74) *Attorney, Agent, or Firm* — Sughrue Mion, PLLC

(57) ABSTRACT

A DMA control system includes: a plurality of DMA control units that are controlled in a manner that, while one of the plurality of DMA control units use a transmission path, the other DMA control units other than the one of the plurality of DMA control unit are prevented from using the transmission path; and a transfer instruction unit that defines transfer amounts of DMA transfers for the respective DMA control units and gives transfer instructions thereto. The transfer instruction unit, when the transfer instruction unit gives a transfer instruction to a first DMA control unit of the plurality of the DMA control units, defines a transfer amount for the first DMA control unit and gives the transfer instruction thereto in accordance with a state of utilizing a second DMA control units of the plurality of the DMA control units.

7 Claims, 24 Drawing Sheets

FIG. 9

|  | #1 | #2 | #3 | #4 | #5 | #6 | #7 |
|---|---|---|---|---|---|---|---|
| CH1 | 512 | 512 | 512 | 512 | – | – | – |
| CH2 | 4 | 5 | – | – | 512 | 512 | – |
| CH3 | 1 | – | 5 | – | 5 | – | 512 |

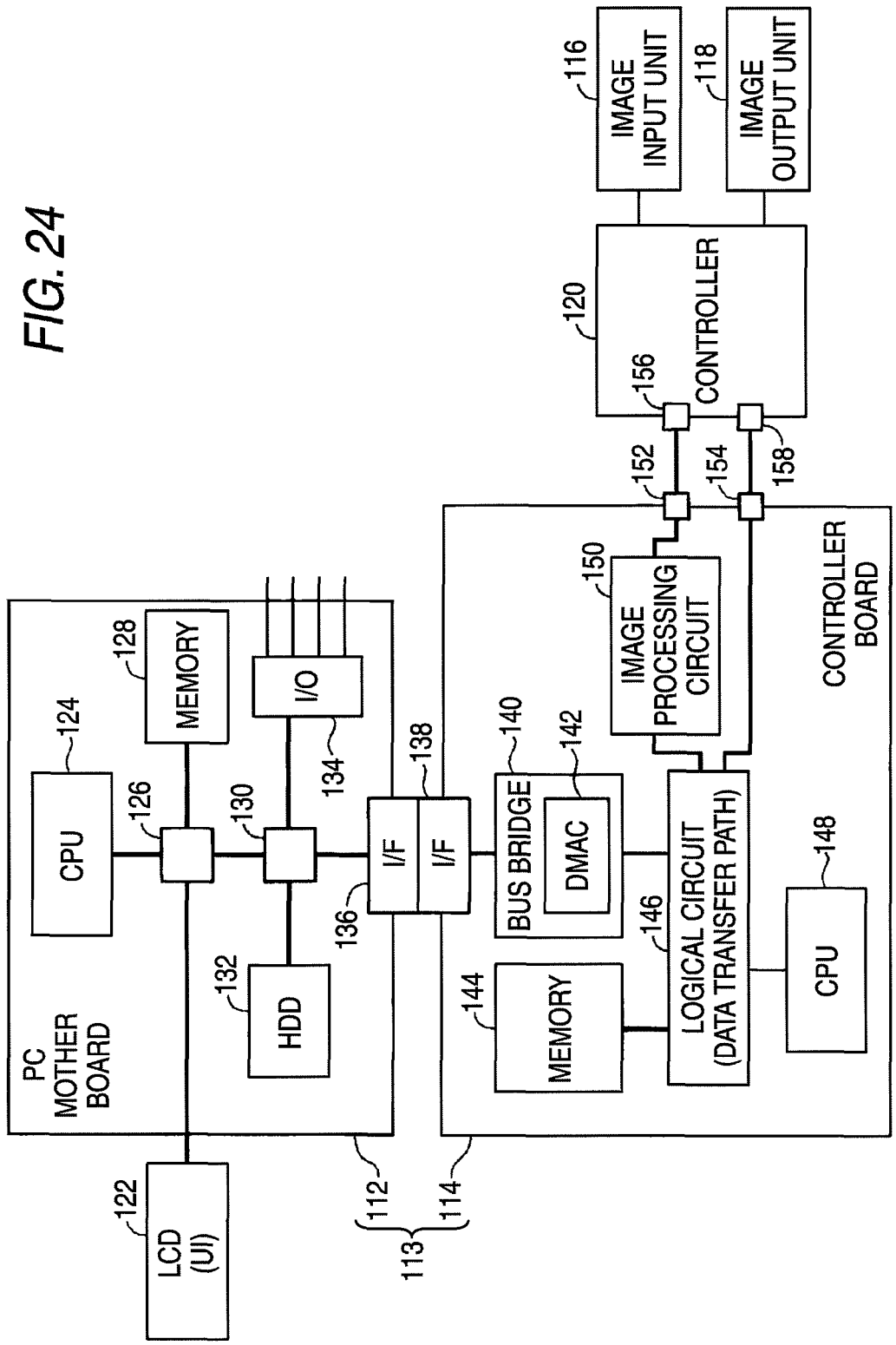

US 8,065,448 B2

DMA CONTROL SYSTEM, PRINTING APPARATUS, TRANSFER INSTRUCTION METHOD AND COMPUTER READABLE MEDIUM

CROSS-REFERENCE TO RELATED APPLICATIONS

This application is based on and claims priority under 35 USC 119 from Japanese Patent Application No. 2008-128832 filed May 15, 2008.

BACKGROUND

1. Technical Field

The present invention relates to a DMA control system, a printing apparatus, a transfer instruction method and a computer readable medium.

2. Related Art a DMA controller for controlling the direct memory access (DMA) transfer in which various kinds devices and a memory can transfer data without intervening a central processing unit (CPU) is known.

SUMMARY

According to an aspect of the invention, a DMA control system includes a plurality of DMA control units and a transfer instruction unit. The plurality of DMA control units is controlled in a manner that, while one of the plurality of DMA control units use a transmission path, the other DMA control units other than the one of the plurality of DMA control unit are prevented from using the transmission path. And the transfer instruction unit defines transfer amounts of DMA transfers for the respective DMA control units and gives transfer instructions thereto. The transfer instruction unit, when the transfer instruction unit gives a transfer instruction to a first DMA control unit of the plurality of the DMA control units, defines a transfer amount for the first DMA control unit and gives the transfer instruction thereto in accordance with a state of utilizing a second DMA control unit of the plurality of the DMA control units.

BRIEF DESCRIPTION OF THE DRAWINGS

Exemplary embodiment(s) of the present invention will be described in detail based on the following figures, wherein:

FIG. 9 is an example of a table which is arranged so as to associate the combinations of channels being used with the descriptor numbers, respectively;

FIG. 24 is a diagram showing an example of the configuration of an image processing system including the DMA control system according to the exemplary embodiment.

DETAILED DESCRIPTION

Hereinafter, an exemplary embodiment of the invention will be explained with reference to drawings.

Figure 1:
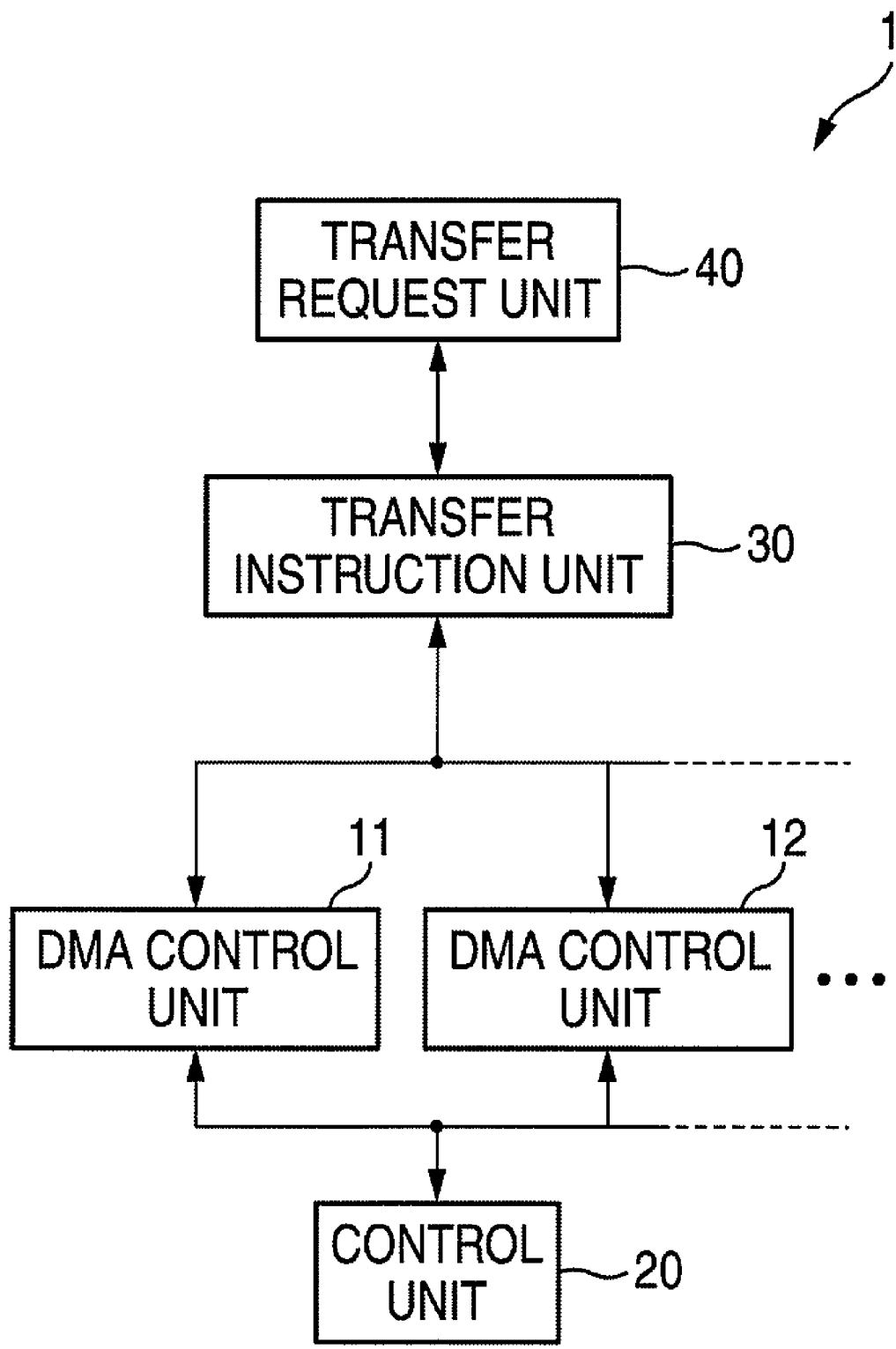
FIG. 1 is a block diagram showing an example of the functional configuration of a DMA control system according to an exemplary embodiment.

FIG. 1 is a block diagram showing an example of the functional configuration of a DMA control system 1 according to the exemplary embodiment. In FIG. 1, the DMA control system 1 includes plural DMA control units 11, 12 . . . a control unit 20, a transfer instruction unit 30 and a transfer request unit 40. In the following explanation, the DMA control units 11, 12 . . . are collectively referred to "DMA control units 10" when it is not necessary to discriminate thereamong.

Figure 2:
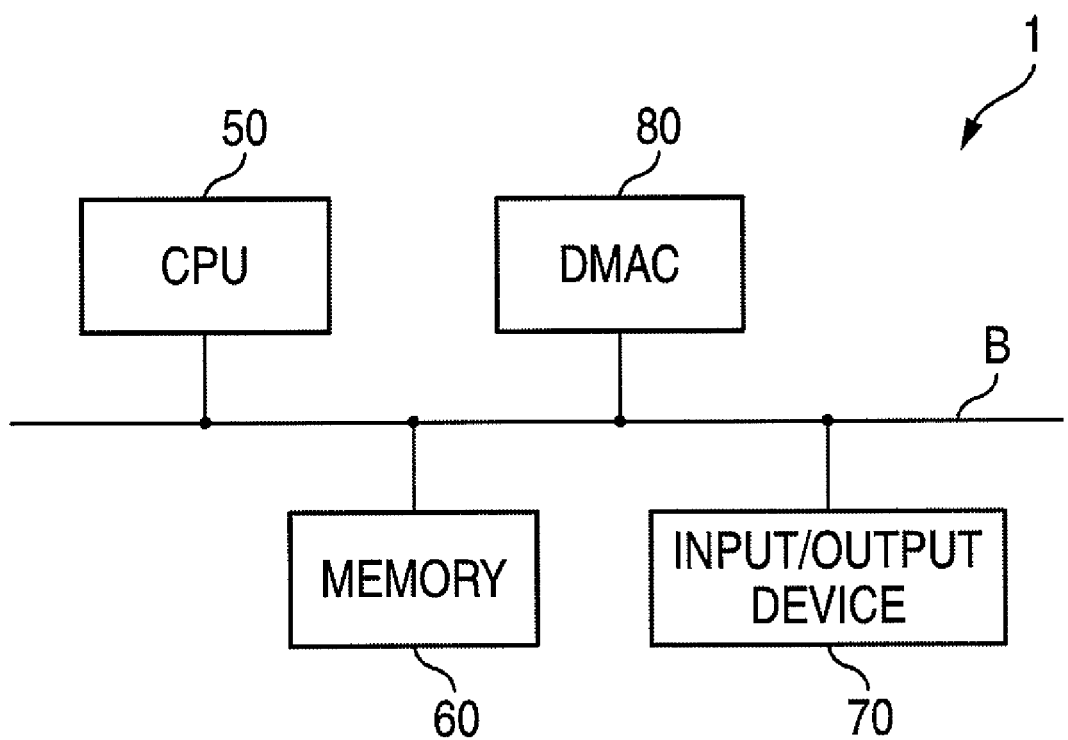
FIG. 2 is a block diagram showing an example of the physical configuration of the DMA control system according to the exemplary embodiment.

FIG. 2 is a block diagram showing an example of the physical configuration of the DMA control system 1 according to the exemplary embodiment. In FIG. 2, the DMA control system 1 includes a CPU 50, a memory 60, an input/output device 70, a DMA controller (hereinafter referred to "DMAC") 80 and a bus B for mutually connecting these constituent elements.

In the example of FIG. 2, the plural DMA control units 10 and the control unit 20 are realized by the single DMAC 80 having plural channels. For example, the DMA control units 11, 12 . . . are realized by the first channel CH1, the second channel CH2 ... of the DMAC 80, respectively. The plurality of the DMA control units 10 and the control unit 20 may be realized by other physical configuration, for example, plural DMACs and a control circuit for controlling these DMACs. For example, a general purpose DMAC may be used as each of the DMAC 80 having plural channels and the plural DMACs.

In the example of FIG. 2, the transfer instruction unit 30 of FIG. 1 is realized by the CPU 50. Specifically, the function of the transfer instruction unit 30 is realized in a manner that a program (for example, a device driver) recorded on a recording medium is read to the memory 60 and executed by the CPU 50. The program may be provided by a computer readable recording medium such as a CD-ROM in which the program is recorded or may be provided as data signals through communication. The transfer instruction unit 30 may be realized by another physical configuration, for example, only by hardware. A program for acting a computer as the plural DMA control units 10 and the transfer instruction unit 30 may be provided.

Each of the plural the DMA control units 10 controls the DMA transfer by using a transmission path based on the transfer instruction. Specifically, each of the plural the DMA control units 10 controls the DMA transfer from a transfer source to a transfer destination via the transmission path (for example, the bus B) in accordance with the transfer instruction. The transfer source and the transfer destination indicate the memory 60 and the input/output device 70 etc. which are defined by the transfer instruction.

The control unit 20 controls the plural DMA control units 10. To be concrete, the control unit 20 controls the DMA control units in a manner that while one of the DMA control units 10 uses the transmission path, the remaining DMA control units 10 do not use the transmission path. For example, the control unit 20 arbitrates the use of the transmission path among the plural DMA control units 10 according to the arbitrating method such as the round robin method or the fixed priority order method. According to one mode, in the case of allocating the use of the transmission path to one of the DMA control units 10, the control unit 20 allows the one DMA control unit 10 to occupy the transmission path during a period from the start of the DMA transfer to the completion thereof (that is, by the transfer instruction) based on the single transfer instruction. According to another mode, in a configuration that the DMA transfer based on the single transfer instruction is performed in a manner of being divided into plural unit of transfers, in the case of allocating the use of the transmission path to one of the DMA control units 10, the control unit 20 allows the one DMA control unit 10 to occupy the transmission path during a period from the start of the single unit transfer to the completion thereof (that is, by the unit of transfer).

The transfer instruction unit 30 generates the transfer instructions for the DMA control units 10 and gives these transfer instructions to the DMA control units 10, respectively. The transfer instruction includes information necessary for the DMA transfer, such as information indicating the address of the transfer source, information indicating a transfer amount, information indicating the address of the transfer destination. According to one mode, the transfer instruction unit 30 defines the transfer amounts of the respective plural the DMA control units 10 and gives the transfer instructions to the plural DMA control units 10, respectively.

When the transfer instruction unit 30 receives a request for the DMA transfer with respect to the particular DMA control unit 10 from the transfer request unit 40, for example, the transfer instruction unit generates the transfer instruction for the particular DMA control unit 10 based on the request and gives the transfer instruction to the particular DMA control unit 10. In this case, the transfer instruction unit 30 may generate a series of transfer instructions based on the request and gives to the DMA control unit 10. The transfer request unit 40 is realized by a higher-rank application, for example.

In a specific example, the transfer instruction unit 30 generates the transfer instruction and stores the transfer instruction in a predetermined storage region. Thereafter, the transfer instruction unit gives information indicating the storage position of the transfer instruction to the DMA control unit 10. The DMA control unit 10 reads the transfer instruction from the predetermined storage region based on the information given from the transfer instruction unit 30. The predetermined storage region is a storage region within the memory 60, for example.

In the case where the transfer instruction unit 30 generates a next transfer instruction with respect to the same DMA control unit 10 among the plural DMA control units 10 after giving a transfer instruction thereto, the transfer instruction unit gives the next transfer instruction after detecting the completion of the DMA transfer based on the previous transfer instruction. Thus, in the case of performing the DMA transfers based on the series of transfer instructions, since it takes a time until the next transfer instruction is given after detecting the completion of the DMA transfer based on the previous transfer instruction, there arises a vacant time (interval) between the DMA transfers.

According to a concrete mode, when the DMA transfer based on the transfer instruction is completed, the DMA control unit 10 or the control unit 20 notifies the completion of the DMA transfer to the transfer instruction unit 30. Then, the transfer instruction unit 30 gives the next transfer instruction to the DMA control unit 10 after receiving the notification of the completion. For example, when the DMA transfer is completed, the DMAC 80 generates an interruption representing the completion of the DMA transfer and gives the interruption to the CPU 50. After receiving the interruption, the CPU 50 gives the next transfer instruction to the DMAC 80. There arises a vacant time until the application of the next transfer instruction after the generation of the interruption. The vacant time includes an interruption processing time, an overhead of the operating system, a setting time of the register of the DMAC 80 etc.

The transfer instruction unit 30 controls, at the time of generating the transfer instruction for the particular DMA control unit 10 among the plural the potions 10, the transfer amount of the DMA transfer defined by the transfer instruction for the particular DMA control unit 10 in accordance with the state of utilizing at least one of the remaining DMA control units 10 other than the particular DMA control unit 10. According to one mode, at the time of instructing the transfer to the particular DMA control unit 10 among the plural potions 10, the transfer instruction unit 30 defines the transfer amount of the DMA transfer of the particular DMA control unit 10 in accordance with the state of utilizing another DMA control unit 10 other than the particular DMA control unit 10 and gives a transfer instruction to the particular DMA control unit 10.

The state indicates a state of being utilized or not according to one mode. For example, the transfer instruction unit 30 controls the transfer amount of the DMA transfer defined by the transfer instruction in accordance with whether or not the another DMA control unit 10 is being utilized. In this case, the transfer instruction unit 30 determines whether or not the another DMA control unit 10 is being utilized based on a predetermined criterion. For example, the transfer instruction unit 30 determines as "being utilized" in each of the following cases:

(a1) when the DMA transfer is being performed by the DMA control unit 10;

(a2) after a transfer instruction is given to the DMA control unit 10, when the DMA transfer based on the transfer instruction has not been completed yet;

(a3) after a transfer instruction is given to the DMA control unit 10, when the DMA transfer based on a series of transfer instructions including the transfer instruction has not been completed yet;

(a4) when the DMA transfer according to a request for the DMA transfer has not been completed after the transfer instruction unit 30 receives the request for the DMA transfer with respect to the DMA control unit 10; and (a5) when the transfer instruction unit 30 does not detect the completion of utilizing the DMA control unit 10 after detecting the start of utilizing the DMA control unit 10 (for example, when the transfer instruction unit 30 does not receive the notification of the completion of a job (work) utilizing the particular DMA control unit 10 after receiving the notification of the start of the job).

According to one mode, in the case where the transfer instruction unit 30 detects the start of utilizing the another DMA control unit 10, when there is a transfer instruction having been generated to be given to the particular DMA control unit 10, the transfer instruction unit cancels the transfer instruction having been generated, and generates a new transfer instruction defining a transfer amount according to the case where the another DMA control unit 10 is begin utilized. According to one mode, in the case where the transfer instruction unit 30 detects the start of utilizing the another DMA control unit 10, when there is a transfer instruction having been generated to be given to the particular DMA control unit 10, the transfer instruction unit cancels the transfer instruction having been generated. Then, the transfer instruction unit 30 defines a transfer amount according to the case where the another DMA control unit 10 is being utilized and gives a transfer instruction to the particular DMA control unit 10. There are following cases (b1) to (b4) as the case where the start of utilizing the another DMA control unit 10 is detected:

(b1) when the start of the DMA transfer by the DMA control unit 10 is detected;

(b2) when a transfer instruction is given to the DMA control unit 10;

(b3) when the transfer instruction unit 30 receives a request for the DMA transfer with respect to the DMA control unit 10; and (b4) when the transfer instruction unit 30 receives the notification of the start of a job utilizing the particular DMA control unit 10 (for example, a notification representing the start of the job or a notification representing that the job has been started).

According to another mode, in the case where the transfer instruction unit 30 detects the completion of utilizing the another DMA control unit 10, when there is a transfer instruction having been generated to be given to the particular DMA control unit 10, the transfer instruction unit cancels the transfer instruction having been generated, and generates a new transfer instruction defining a transfer amount according to the case where the another DMA control unit 10 is not being utilized. According to one mode, in the case where the transfer instruction unit 30 detects the completion of utilizing the another DMA control unit 10, when there is a transfer instruction having been generated to be given to the particular DMA control unit 10, the transfer instruction unit cancels the transfer instruction having been generated, then defines a transfer amount according to the case where the another DMA control unit 10 is not being utilized and gives a transfer instruction to the particular DMA control unit 10. There are following cases (c1) to (c5) as the case where the completion of utilizing the another DMA control unit 10 is detected:

(c1) when the completion of the DMA transfer by the DMA control unit 10 is detected;

(c2) when the completion of the DMA transfer by the DMA control unit 10 based on a transfer instruction is detected;

(c3) when the completion of the DMA transfer by the DMA control unit 10 based on a series of transfer instructions is detected;

(c4) when the completion of the DMA transfer by the DMA control unit 10 as a subject of a request according to the request received by the transfer instruction unit 30 is detected; and (c5) in the case of receiving the notification of the completion of a job utilizing the DMA control unit 10 (for example, a notification that the job will complete soon or a notification that the job has been completed).

In the configuration where the DMA control system 1 includes the three or more DMA control units 10, according to one mode, in the case of generating a transfer instruction for the particular DMA control unit 10, the transfer instruction unit 30 controls a transfer amount of the DMA transfer defined by the transfer instruction according to the combination of states of utilizing other DMA control units 10 other than the particular DMA control unit 10. For example, the transfer instruction unit 30 controls a transfer amount of the DMA transfer defined by the transfer instruction according to the combination of the DMA control units 10 being utilized among the other DMA control units 10 other than the particular DMA control unit 10. According to one mode, in the case of generating a transfer instruction for the particular DMA control unit 10, the transfer instruction unit 30 defines a transfer amount of the particular DMA control unit 10 according to the combination of the state of utilizing other DMA control units 10 other than the particular DMA control unit 10, and gives a transfer instruction to the particular DMA control unit 10.

For example, there is in advance provided with a table in which the combination of the DMA control units 10 being utilized is associated with control information for controlling a transfer amount. Then, the transfer instruction unit 30 specifies the control information corresponding to which the combination of the DMA control units 10 being utilized with reference to the table and generates a transfer instruction based on the control information thus specified. The control information is information representing the upper limit of the transfer amount according to one transfer instruction, for example. Further, the control amount is set based on actual measurement value of the DMA transfer rate, for example. According to one mode, the control information of the table is changeable and so may be changed in accordance with the use of a user, for example.

According to one mode, when the particular DMA control unit 10 performs the DMA transfer by itself or when each of all other DMA control units 10 other than the particular DMA control unit 10 is not utilized, the transfer instruction for the particular DMA control unit 10 is generated so as to perform the DMA transfer with a transfer amount of the best transfer efficiency.

According to another mode, in the case where the transfer instruction unit 30 detects the change of the combination, when there is a transfer instruction having been generated to be given to the particular DMA control unit 10, the transfer instruction unit cancels the transfer instruction having been generated, and generates a new transfer instruction defining a transfer amount according to the combination after the change. According to one mode, in the case where the transfer instruction unit 30 detects the change of the combination, when there is a transfer instruction having been generated to be given to the particular DMA control unit 10, the transfer instruction unit cancels the transfer instruction having been generated, then defines a transfer amount according to the combination after the change and gives a transfer instruction to the particular DMA control unit 10.

The transfer instruction unit 30 may give the control of the transfer amount according to the state of utilizing to all of the plural DMA control units 10 or only a part of the plural DMA control units 10. That is, each of all the plural DMA control units 10 may be the particular DMA control unit 10 or only a part of the plural DMA control units 10 may be the particular DMA control unit 10.

According to one mode, the DMA control system 1 is contained in a printing apparatus. In this case, in the case of performing a procedure of image reading, printing or conversion of image information, when the transfer instruction unit 30 generates a transfer instruction for the particular DMA control unit 10 among the plural DMA control units 10 to thereby perform the DMA transfer of the image information, the transfer instruction unit defines a transfer amount of the DMA transfer for the particular DMA control unit 10 in accordance with the state of utilizing other DMA control units 10 other than the particular DMA control unit 10 and gives a transfer instruction to the particular DMA control unit 10. For example, when the printing apparatus performs the procedure of image reading, printing or conversion of image information, when the transfer instruction unit 30 generates a transfer instruction for the particular DMA control unit 10, the transfer instruction unit controls the transfer amount of the DMA transfer defined by the transfer instruction in accordance with the state of utilizing other DMA control units 10 other than the particular DMA control unit 10.

Hereinafter, the operation of the DMA control system 1 according to the exemplary embodiment will be explained concretely. In the following explanation, it is supposed that the plural the DMA control units 10 and the control unit 20 are realized by the DMAC 80 having N (N is an integer of 2 or more) channels CH1 to CHN. Further, it is supposed that the transfer instruction unit 30 is realized by the cooperation of the CPU 50 and the device driver. Furthermore, it is supposed that the transfer request unit 40 is realized by the cooperation of the CPU 50 and the higher-rank application.

First, the explanation will be made as to a concrete example of the operation of the DMA control system 1 when notifying the channel CH1 of the DMAC 80.

In this example, the DMAC 80 has a scatter-gather function capable of continuously transferring data with respect to discrete addresses. Further, the DMAC 80 performs the DMA transfer based on the descriptor generated by the transfer instruction unit 30. The descriptor is transfer information including information necessary for the DMA transfer.

The transfer instruction unit 30 generates the descriptor for each predetermined unit transfer amount and generates a descriptor list by continuing the plural descriptors thus generated. The descriptor list corresponds to the transfer instruction. The descriptor list is stored in a descriptor storage area provided in the memory 60 and the storage address of the descriptor list is registered in a descriptor list management queue of a FIFO type for the channel CH1. The descriptor list management queue is prepared for each channel of the DMAC 80.

The transfer instruction unit 30 sets the address registered in the descriptor list management queue for the channel CH1 to the channel CH1 of the DMAC 80 and activates the channel CH1. Thus, the DMAC 80 sequentially reads the descriptors one by one from the descriptor list stored at the address thus set and executes the DMA transfer of the channel CH1 continuously according to the descriptors thus read.

When the DMA transfer is completed as to all the descriptors described in the descriptor list, the DMAC 80 generates and gives an interruption representing the completion of the DMA transfer of the channel CH1 to the CPU 50. Then, the transfer instruction unit 30 reads the address of the next descriptor list from the descriptor list management queue of the channel CH1 and sets the descriptor list thus read to the channel CH1. Then, the descriptors described in the descriptor list stored at the address thus set are sequentially read and the DMA transfer of the channel CH1 continuously is performed continuously. By repeatedly performing these operations, the DMA transfer is executed based on a series of the descriptor lists and so the DMA transfer of all the data to be transferred is performed finally.

Figure 3:
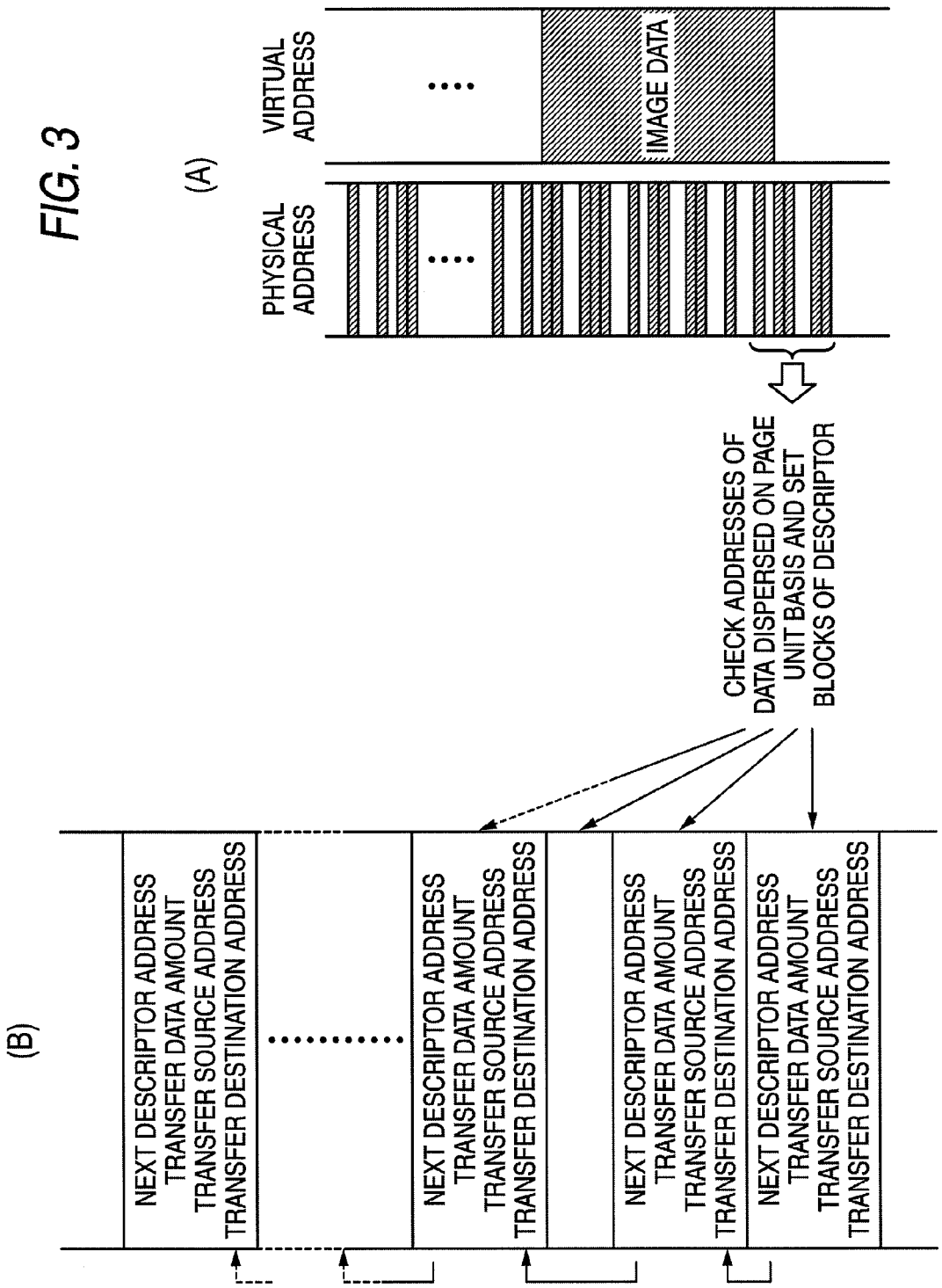
FIG. 3 is a diagram showing an example of a descriptor list read by a DMAC in a system employing the virtual storage method.

FIG. 3 is a diagram showing an example of the descriptor list read by the DMAC 80 in the system employing the virtual storage method.

The memory 60 is managed by the virtual storage method. As shown at the right side drawing in FIG. 3, physical address areas which are physically discrete are mapped on a continuous virtual address area and managed. In the case of actually accessing stored data, the data is accessed in a manner that the continuous address area of the virtual address area is converted into the corresponding physical address areas according to an address translation table etc. Although the minimum unit of the physical memory capable of being mapped on the virtual address is called as a page, the transfer instruction unit 30 checks the addresses of data physically dispersed on the page unit basis and generates the descriptor for each data.

As shown at the left side drawing in FIG. 3, the descriptor is configured to include information about a next descriptor address, a transfer data amount, a transfer source address and a transfer destination address.

The "next descriptor address" is data representing the address of the descriptor to be read next by the DMAC 80 among the descriptors sequentially arranged in the descriptor list. When the next descriptor is the last descriptor to be read last among the descriptors of the descriptor list, data representing that the next descriptor is the last one of the descriptor list is stored in the area of the next descriptor address. According to the next descriptor address, the descriptors stored in the physically discrete addresses are read continuously and the DMA transfer is performed.

The "transfer data amount" is data representing the size of data subjected to the DMA transfer by the corresponding descriptor. The "transfer source address" is data representing the address where data to be transferred is stored. The "transfer destination address" is data representing the address where data read from the transfer source address by an amount of the transfer data is stored.

In this example, the maximum data amount capable of being transferred by each descriptor is the page size, and the "transfer data amount" of each descriptor is set to a fixed value (unit transfer amount) equal to or smaller than the page size. Thus, the number of the descriptors constituting the descriptor list (that is, the number of the descriptors of the descriptor list) is proportional to the transfer amount of the DMA transfer defined by the descriptor list.

Figure 4:
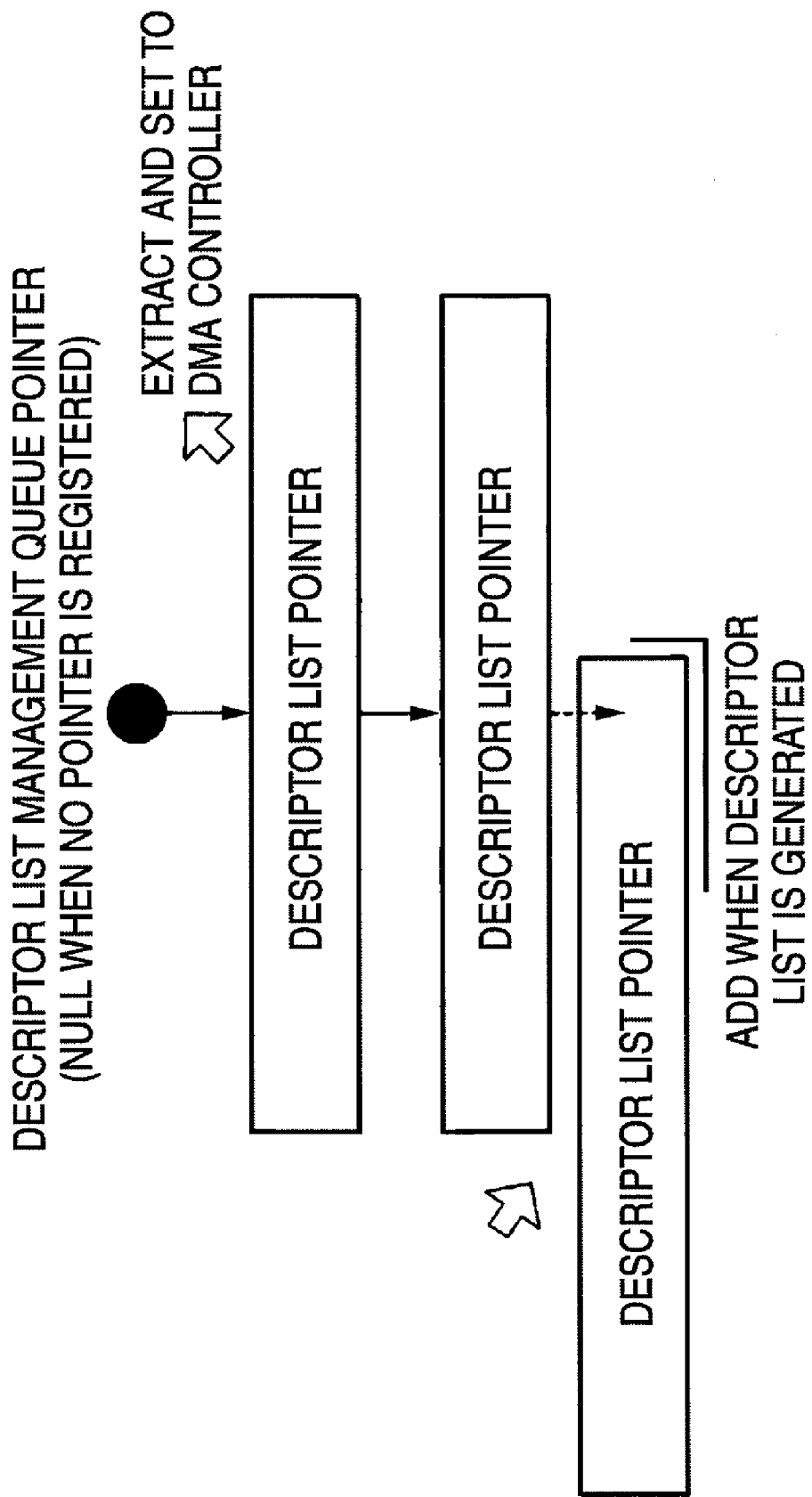
FIG. 4 is an explanatory diagram for explaining the configuration of a descriptor list management queue for managing the descriptor list.

FIG. 4 is an explanatory diagram for explaining the configuration of a descriptor list management queue for managing the descriptor list. The descriptor list management queue is a buffer which is configured by continuously arranging, as a list structure, descriptor list pointers each representing the address where the corresponding descriptor list is stored (in detail, the address where the descriptor at the head portion of the descriptors constituting the descriptor list is stored). Further, a descriptor list management queue pointer indicating the descriptor list pointer at the head portion of the descriptor list management queue is stored in the predetermined register of the CPU 50 (or a predetermined area of the memory etc.). Since the descriptor list management queue is configured as a FIFO type, when the transfer instruction unit 30 reads the descriptor list pointer at the head portion, the descriptor list management queue pointer is rewritten so as to indicate the next descriptor list pointer. The descriptor list management queue pointer exists for each of the channels of the DMAC 80.

When the descriptor list is generated newly and stored in a predetermined storage area, the transfer instruction unit 30 adds a descriptor list pointer representing the address of the descriptor list thus generated at the last portion of the descriptor list management queue, whereby the addresses of the descriptor lists are registered in the order of the generation.

When no descriptor list pointer is registered in the descriptor list management queue, the descriptor list management queue pointer is set to be NULL.

In the case of executing the DMA transfer by the channel CH1, the transfer instruction unit 30 sets the descriptor list pointer at the head portion indicated by the descriptor list management queue pointer of the channel CH1 to the channel CH1 of the DMAC 80 to start the DMA transfer by the channel CH1 to thereby perform the DMA transfer based on the descriptor list indicated by the descriptor list pointer. The DMA transfer is performed continuously without being interrupted by the CPU 50 until the DMA transfer of the single descriptor list is completed. On the other hand, during the DMA transfer by the channel CH1, the transfer instruction unit 30 generates in a preceding manner the next descriptor list and succeeding descriptor lists for the channel CH1 and registers the descriptor list pointers of these descriptor lists thus generated in the descriptor list management queue for the channel CH1.

When the DMA transfer by the single descriptor list is completed, the DMAC 80 generates an interruption for the CPU 50 at this timing. Then, the transfer instruction unit 30 sets the next descriptor list pointer indicated by the descriptor list management queue pointer of the channel CH1 to the channel CH1 of the DMAC 80 to thereby perform the DMA transfer. Thus, the descriptor lists for the channel CH1 are read in the order registered in the descriptor list management queue for the channel CH1 to thereby perform the DMA transfer by the channel CH1.

Figure 5:
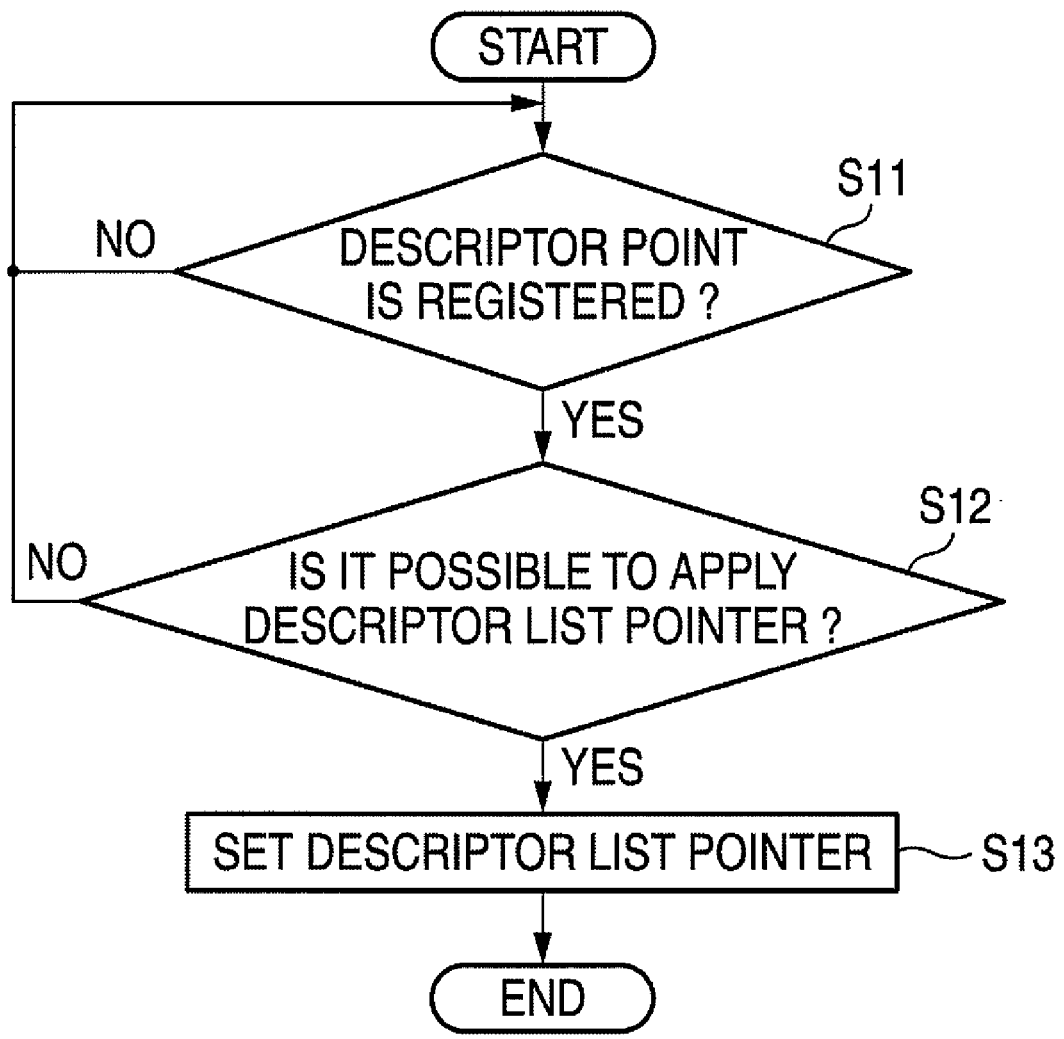
FIG. 5 is a flowchart showing an example of the applying operation of the descriptor list performed by a transfer instruction unit.

FIG. 5 is a flowchart showing an example of the giving operation of the descriptor list performed by the transfer instruction unit 30. Hereinafter, the explanation will be made as to the example of the giving operation of the descriptor list performed by the transfer instruction unit 30 with reference to FIG. 5. Although the explanation will be made as to the case of the channel CH1, the giving operation is performed also as to other channels in the similar manner. The processing of FIG. 5 is executed repeatedly, for example.

The transfer instruction unit 30 determines whether or not a descriptor point is registered in the descriptor list management queue for the channel CH1 (S11).

When it is determined that no descriptor point is registered (NO in S11), the transfer instruction unit 30 repeats the processing of the step S11.

On the other hand, when it is determined that a descriptor point is registered (YES in S11), the transfer instruction unit 30 determines whether or not it is possible to give the descriptor list pointer to the channel CH1 (S12). To be concrete, when the interruption representing the completion of the DMA transfer by the channel CH1 is not generated yet after setting the descriptor list pointer to the channel CH1, the transfer instruction unit 30 determines that it is not possible to give the descriptor list pointer, whilst determines that it is possible to give the descriptor list pointer when the interruption is generated.

When it is determined to be possible to give the descriptor list pointer (YES in S12), the transfer instruction unit 30 sets the descriptor list pointer indicated by the descriptor list management queue pointer to the channel CH1 (S13) and terminates the processing.

On the other hand, when it is determined to be not possible to give the descriptor list pointer (NO in S12), the transfer instruction unit 30 returns the processing to the step S11.

Figure 6:
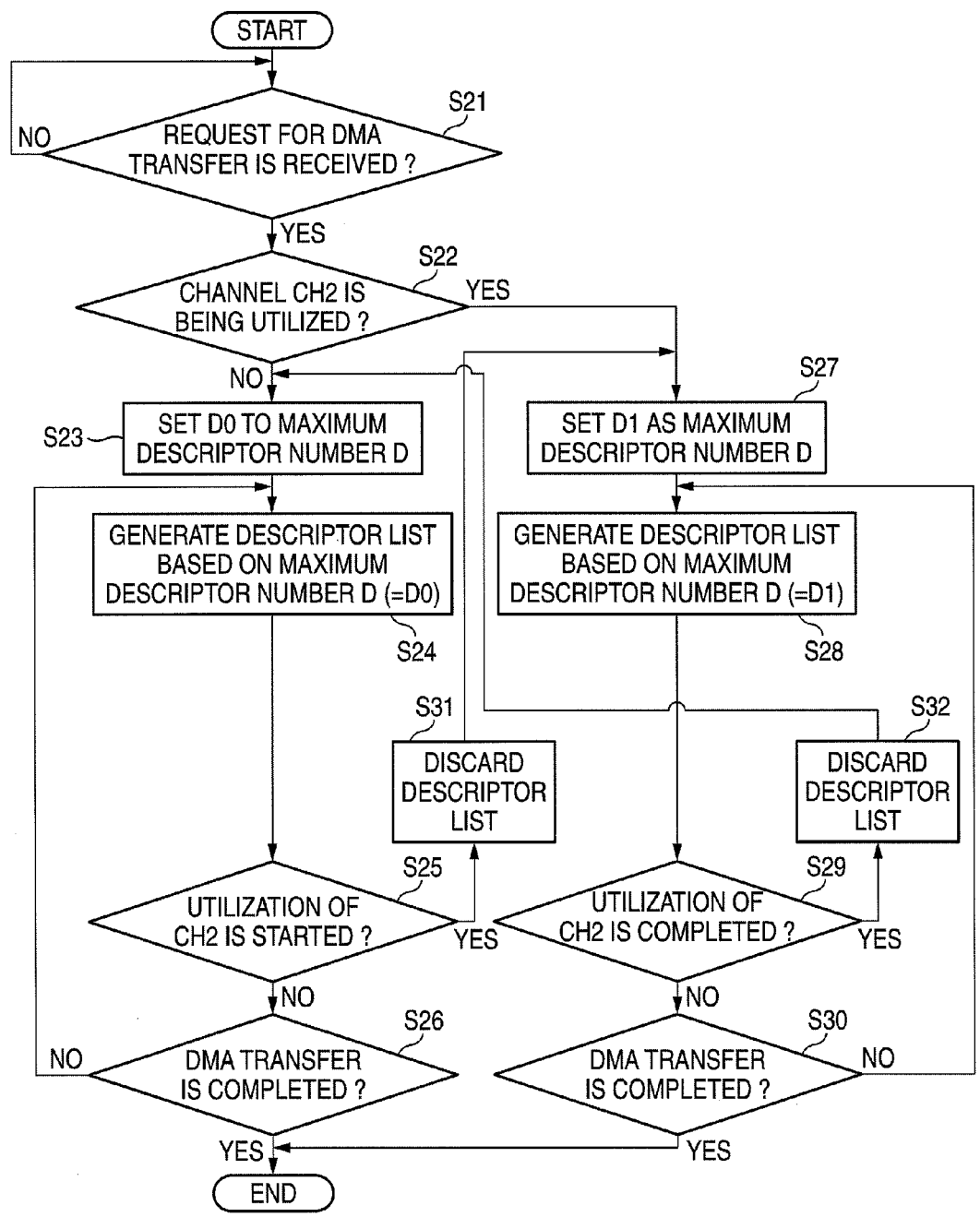
FIG. 6 is a flowchart showing an example of the applying operation of the descriptor list performed by the transfer instruction unit.

FIG. 6 is a flowchart showing an example of the operation for generating the descriptor list performed by the transfer instruction unit 30. FIG. 6 shows a procedure in the case of generating the descriptor list for the channel CH1 in accordance with the state of utilizing the channel CH2. Hereinafter, the explanation will be made as to the example of the operation for generating the descriptor list performed by the transfer instruction unit 30 with reference to FIG. 6. The processing of FIG. 6 is executed repeatedly, for example.

The transfer instruction unit 30 is placed in a standby state until receiving the request for the DMA transfer with respect to the channel CH1 from the transfer request unit 40 (NO in S21), and proceeds the processing to a step S22 when receives the request (YES in S21).

In the step S22, the transfer instruction unit 30 determines whether or not the channel CH2 of the DMAC 80 is being utilized. To be concrete, when the completion of utilizing the channel CH2 is not detected yet after detecting the start of utilizing the channel CH2, the transfer instruction unit 30 determines that the channel CH2 is being utilized. The transfer instruction unit 30 determines that the channel CH2 is not being utilized when the completion of utilizing is detected.

When it is determines that the channel CH2 is not being utilized (NO in S22), the transfer instruction unit 30 sets a value D0 (D0 is an integer of 1 or more) corresponding to the case of not utilizing the channel CH2 as a maximum descriptor number D that is a parameter for generating the descriptor list. The value D0 corresponding to the case of not utilizing the channel CH2 (that is, the case where only the channel CH1 operates) is a descriptor number that is obtained by measuring in advance, for example, and in which the transfer efficiency becomes maximum.

Next, the transfer instruction unit 30 generates the descriptor list for the channel CH1 for performing the DMA transfer as to data to be transferred specified by the request, based on the maximum descriptor number D (=D0) (S24). To be concrete, the transfer instruction unit 30 generates the descriptor list in a manner that the maximum descriptor number D (=D0) is the maximum of the descriptor number constituting the descriptor list. Thus, supposing that the transfer data amount of single descriptor is a, in the case where, among data to be transferred, the remaining amount of data as to which the descriptor is not generated yet is larger than $\{a \times (D0-1)\}$, the descriptor list of the descriptor number D0 is generated. In contrast, when the remaining amount of data is equal to or smaller than {a×(D0−1)}, the descriptor list of the descriptor number, which is smaller than D0 and according to the remaining data amount, is generated.

Next, the transfer instruction unit 30 determines whether or not the start of utilizing the channel CH2 is detected (S25). To be concrete, the transfer instruction unit 30 determines whether or not the notification of the start of a job utilizing the channel CH2 is received from the higher-rank application.

When it is determined that the start of utilizing the channel CH2 is not detected yet (NO in S25), the transfer instruction unit 30 determines whether or not the DMA transfer based on the request is completed (S26). To be concrete, the transfer instruction unit 30 determines that the DMA transfer is completed when the descriptor list management queue pointer is set to be NULL and the remaining amount of data as to which the descriptor is not generated yet is zero, otherwise determines that the DMA transfer is not completed yet.

When it is determined that the DMA transfer is completed (YES in S26), the transfer instruction unit 30 terminates the processing.

In contrast, when it is determined that the DMA transfer is not completed yet (NO in S26), the transfer instruction unit 30 returns the processing to the step S24. In the second or succeeding processing of the step S24, the descriptor list is generated when the remaining data amount is not zero, whilst the descriptor list is not generated when the remaining data amount is zero.

When it is determined in the step S22 that the channel CH2 is being utilized (YES in S22), the transfer instruction unit 30 sets a value D1 (D1 is an integer of 1 or more) corresponding to the case where the channel CH2 is being utilized as the maximum descriptor number D (S27).

Then, the transfer instruction unit 30 generates, based on the maximum descriptor number D (=D1), the descriptor list for the channel CH1 for performing the DMA transfer of the data to be transferred specified by the request (S28). To be concrete, the transfer instruction unit 30 generates the descriptor list in a manner that the maximum descriptor number D (=D1) is the maximum of the descriptor number constituting the descriptor list. Thus, supposing that the transfer data amount of single descriptor is a, in the case where, among data to be transferred, the remaining amount of data as to which the descriptor is not generated yet is larger than {a×(D1−1)}, the descriptor list of the descriptor number D1 is generated. In contrast, when the remaining amount of data is equal to or smaller than {a×(D1−1)}, the descriptor list of the descriptor number, which is smaller than D1 and according to the remaining data amount, is generated.

Next, the transfer instruction unit 30 determines whether or not the completion of utilizing the channel CH2 is detected (S29). To be concrete, the transfer instruction unit 30 determines whether or not the notification of the completion of a job utilizing the channel CH2 is received from the higher-rank application.

When it is determined that the completion of the utilizing the channel CH2 is not detected yet (NO in S29) the transfer instruction unit 30 determines whether or not the DMA transfer based on the request is completed (S30). To be concrete, the transfer instruction unit 30 determines that the DMA transfer is completed when the descriptor list management queue pointer is set to be NULL and the remaining amount of data as to which the descriptor is not generated yet is zero, otherwise determines that the DMA transfer is not completed yet.

When it is determined that the DMA transfer is completed (YES in S30), the transfer instruction unit 30 terminates the processing.

In contrast, when it is determined that the DMA transfer is not completed yet (NO in S30), the transfer instruction unit 30 returns the processing to the step S28. In the second or succeeding processing of the step S28, the descriptor list is generated when the remaining data amount is not zero, whilst the descriptor list is not generated when the remaining data amount is zero.

When it is determined that the start of utilizing the channel CH2 is detected in the step S25 (YES in S25), the transfer instruction unit 30 discards all the descriptor lists for the channel CH1 stored in the descriptor storage area and deletes all the descriptor list pointers registered in the descriptor list management queue for the channel CH1 (S31), and then proceeds the processing to the step S27. Thus, the descriptor list of the descriptor number according to the case where the channel CH2 is not being utilized is discarded and a new descriptor list of the descriptor number according to the case where the channel CH2 is being utilized is generated. When the descriptor list for the channel CH1 is not stored, the processing of the step S31 is not performed.

When it is determined that the completion of utilizing the channel CH2 is detected in the step S29 (YES in S29) the transfer instruction unit 30 discards all the descriptor lists for the channel CH1 stored in the descriptor storage area and deletes all the descriptor list pointers registered in the descriptor list management queue for the channel CH1 (S32), and then proceeds the processing to the step S23. Thus, the descriptor list of the descriptor number according to the case where the channel CH2 is being utilized is discarded and a new descriptor list of the descriptor number according to the case where the channel CH2 is not being utilized is generated. When the descriptor list for the channel CH1 is not stored, the processing of the step S32 is not performed.

In the aforesaid example, like the aforesaid case of the channel CH1, the transfer instruction unit 30 may generate the descriptor list for the channel CH2 in accordance with the state of utilizing the channel CH1. In contrast, the transfer instruction unit 30 may generate the descriptor list for the channel CH2 irrespective of the state of utilizing the channel CH1. For example, as shown in FIG. 7, the transfer instruction unit 30 may generate the descriptor list for the channel CH2 supposing that the maximum descriptor number D is a constant value.

Figure 7:
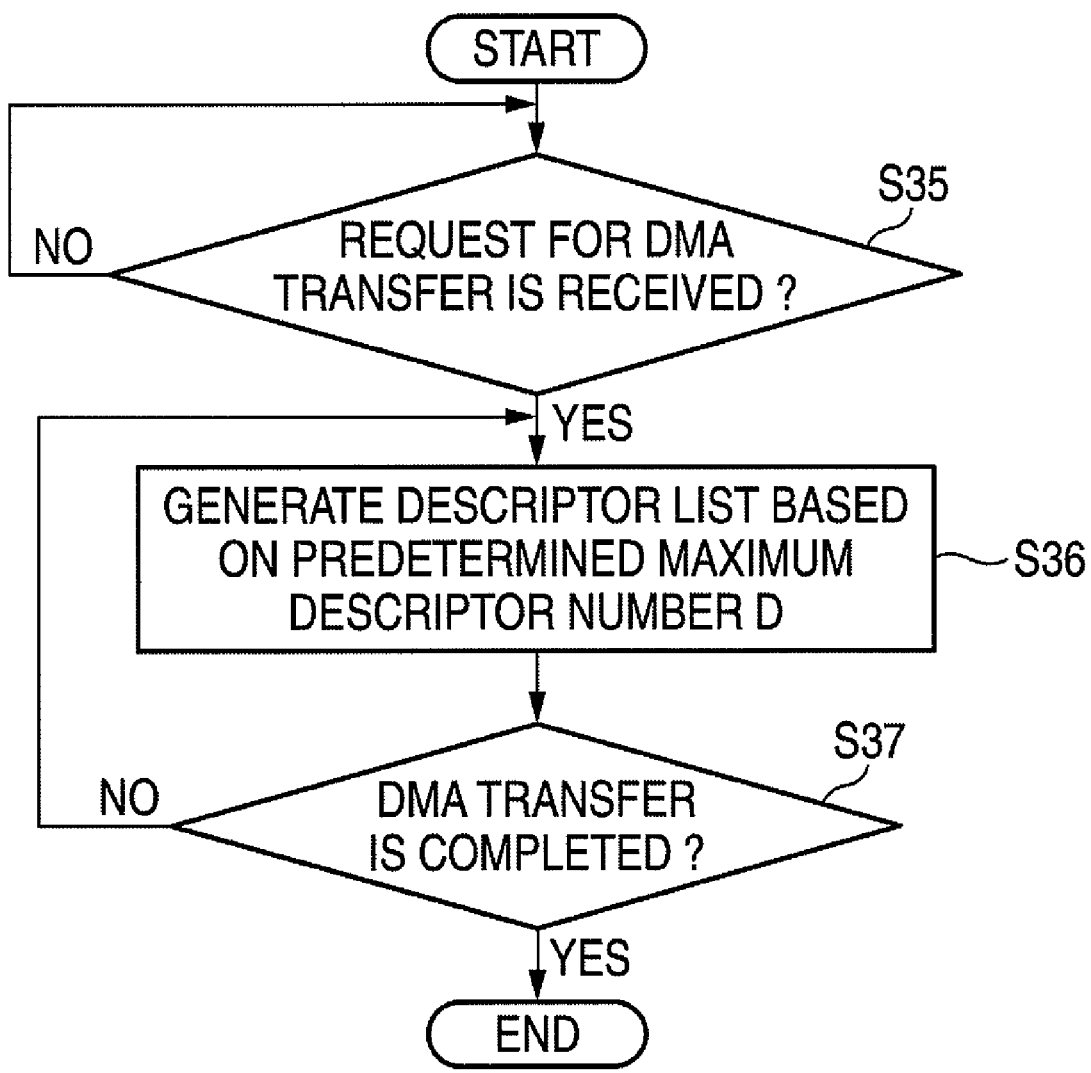
FIG. 7 is a flowchart showing another example of the applying operation of the descriptor list performed by the transfer instruction unit.

In FIG. 7, the transfer instruction unit 30 is placed in a standby state until the receiving the request for the DMA transfer with respect to the channel CH2 from the transfer request unit 40 (NO in S35), and proceeds the processing to the step S36 when the request is received (YES in S35).

In the step S36, the transfer instruction unit 30 generates the descriptor list for the channel CH2 for performing the DMA transfer as to data to be transferred specified by the request, based on the maximum descriptor number D which is the predetermined constant value. To be concrete, the transfer instruction unit 30 generates the descriptor list in a manner that the maximum descriptor number D is the maximum of the descriptor number constituting the descriptor list. Thus, supposing that the transfer data amount of single descriptor is a, in the case where, among data to be transferred, the remaining amount of data as to which the descriptor is not generated yet is larger than {a×(D−1)}, the descriptor list of the descriptor number D is generated. In contrast, when the remaining amount of data is equal to or smaller than {a×(D−1)}, the descriptor list of the descriptor number, which is smaller than D and according to the remaining data amount, is generated.

Then, the transfer instruction unit 30 determines whether or not the DMA transfer based on the request is completed (S37). When it is determined that the DMA transfer is not completed yet (NO in S37), the processing is returned to the step S36. In contrast, when it is determined that the DMA transfer is completed (YES in S37), the processing is terminated.

Figure 8:
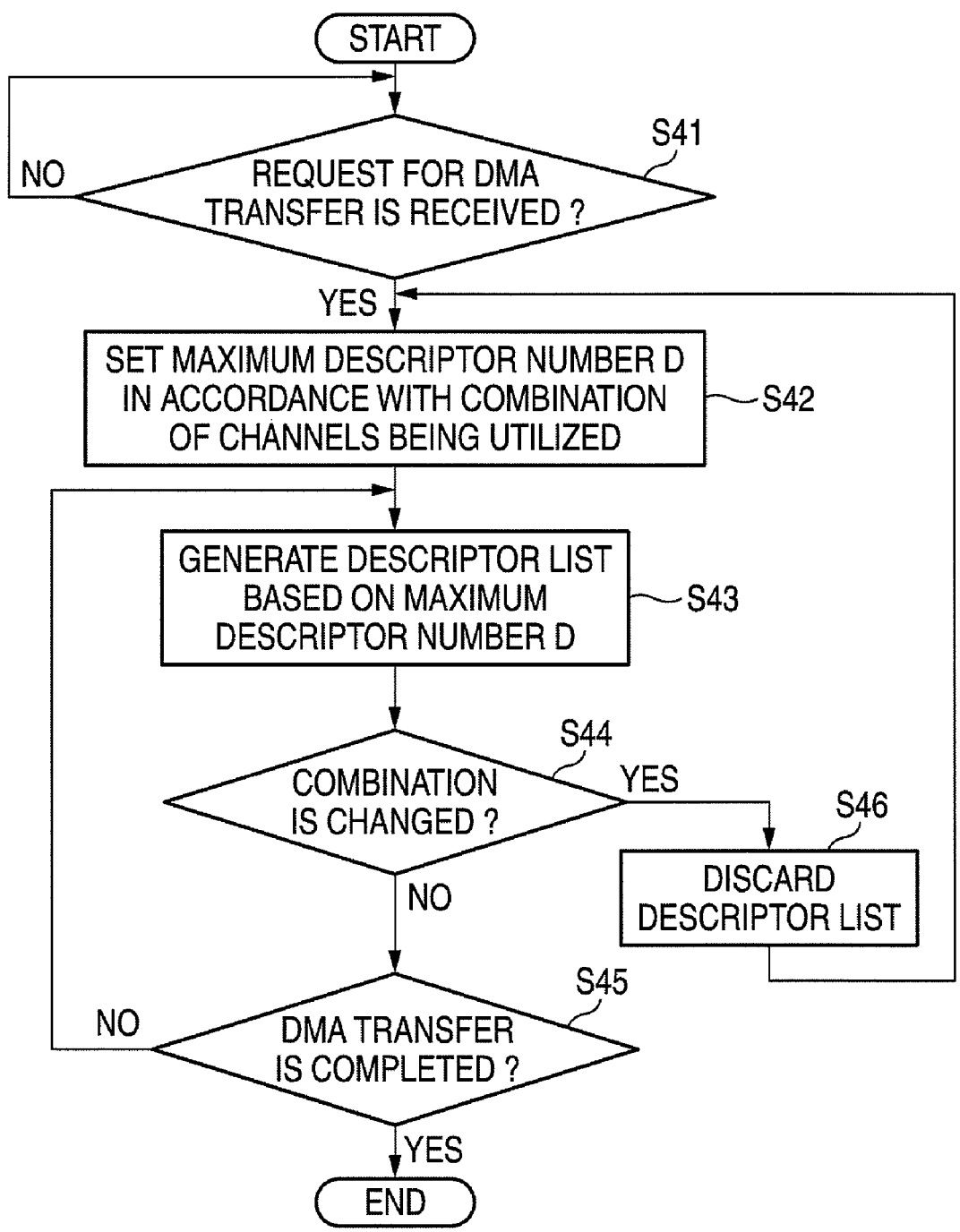
FIG. 8 is a flowchart showing another example of the applying operation of the descriptor list performed by the transfer instruction unit.

FIG. 8 is a flowchart showing another example of the operation for generating the descriptor list performed by the transfer instruction unit 30. FIG. 8 shows a procedure in the case of generating the descriptor list for the channel CH1 in accordance with the states of utilizing the other channels CH2 to CHN. Hereinafter, the explanation will be made as to another example of the operation for generating the descriptor list performed by the transfer instruction unit 30 with reference to FIG. 8.

The transfer instruction unit 30 is placed in a standby state until receiving the request for the DMA transfer with respect to the channel CH1 from the transfer request unit 40 (NO in S41), and proceeds the processing to a step S42 when receives the request (YES in S41).

In step S42, the transfer instruction unit 30 sets a descriptor number according to the combination of the channels being utilized among the other channels CH2 to CHN as the maximum descriptor number D. To be concrete, the transfer instruction unit 30 determines the maximum descriptor number D based on a table which is set in advance so as to associate the combinations of the channels being utilized with the descriptor numbers, respectively. The descriptor numbers in the table are optimum values obtained from the actual measurement values of the DMA transfer rate, for example.

Next, the transfer instruction unit 30 generates the descriptor list for the channel CH1 for performing the DMA transfer as to data to be transferred specified by the request, based on the maximum descriptor number D set in the step S42 (S43). To be concrete, the transfer instruction unit 30 generates the descriptor list in a manner that the maximum descriptor number D is the maximum of the descriptor number constituting the descriptor list. Thus, supposing that the transfer data amount of single descriptor is a, in the case where, among data to be transferred, the remaining amount of data as to which the descriptor is not generated yet is larger than {a× (D−1)}, the descriptor list of the descriptor number D is generated. In contrast, when the remaining amount of data is equal to or smaller than {a×(D−1)}, the descriptor list of the descriptor number, which is smaller than D and according to the remaining data amount, is generated.

Then, the transfer instruction unit 30 determines whether or not the change of the combination of the channels being utilized among the other channels CH2 to CHN is detected (S44). The transfer instruction unit 30 detects the change of the combination based on the notification of the start or termination of a job utilizing another channel from the higher-rank application, for example.

When it is determined that the change of the combination is not detected yet (NO in S44), the transfer instruction unit 30 determines whether or not the DMA transfer based on the request is completed (S45). To be concrete, the transfer instruction unit 30 determines that the DMA transfer is completed when the descriptor list management queue pointer is set to be NULL and the remaining amount of data as to which the descriptor is not generated yet is zero, otherwise determines that the DMA transfer is not completed yet.

When it is determined that the DMA transfer is completed (YES in S45), the transfer instruction unit 30 terminates the processing.

In contrast, when it is determined that the DMA transfer is not completed yet (NO in S45), the transfer instruction unit 30 returns the processing to the step S43. In the second or succeeding processing of the step S43, the descriptor list is generated when the remaining data amount is not zero, whilst the descriptor list is not generated when the remaining data amount is zero.

When it is determined that the change of the combination is detected (YES in S44), the transfer instruction unit 30 discards all the descriptor lists for the channel CH1 stored in the descriptor storage area and deletes all the descriptor list pointers registered in the descriptor list management queue for the channel CH1 (S46), and then proceeds the processing to the step S42. Thus, the descriptor list of the descriptor number according to the combination before the change is discarded and a new descriptor list of the descriptor number according to the combination after the change is generated. When the descriptor list for the channel CH1 is not stored, the processing of the step S46 is not performed.

In the aforesaid example, like the aforesaid case of the channel CH1, the transfer instruction unit 30 may generate the descriptor list for the channel other than the channel CH1 in accordance with the states of utilizing the other channels. In contrast, the transfer instruction unit 30 may generate the descriptor list for the channel other than the channel CH1 irrespective of the states of utilizing the other channels. For example, the transfer instruction unit 30 may generate the descriptor list for the channel other than the channel CH1 supposing that the maximum descriptor number D is a constant value.

FIG. 9 shows an example of a table which is arranged so as to associate the combinations of the channels being utilized with the descriptor numbers, respectively. The processing of the step S42 is executed based on the table shown in FIG. 9, for example. In FIG. 9, numerals within the table represent the descriptor numbers and "-" within the table represents that the corresponding channel is not being utilized.

In the table shown in FIG. 9, the descriptor numbers given to the channels being utilized are set respectively for each combination of the channels being utilized among the channels CH1 to CH3.

For example, the combination #1 represents the case where all the channels CH1 to CH3 are being utilized. In this case, the descriptor numbers given to the channels CH1, CH2 and CH3 are 512, 4 and 1, respectively. Thus, when the descriptor list for the channel CH1 is generated in the case where each of the channels CH1 and CH2 is being utilized, "512" is set as the maximum descriptor number D. Further, when the descriptor list for the channel CH2 is generated in the case where each of the channels CH1 and CH3 is being utilized, "4" is set as the maximum descriptor number D.

Further, for example, the combination #2 represents the case where each of the channels CH1 and CH2 is being utilized and the channel CH3 is not being utilized. In this case, the descriptor numbers given to the channels CH1 and CH2 are 512 and 5, respectively. Thus, when the descriptor list for the channel CH1 is generated in the case where the CH2 is being utilized and the channel CH3 is not being utilized, "512" is set as the maximum descriptor number D. Further, when the descriptor list for the channel CH2 is generated in the case where each of the CH1 is being utilized and the channel CH3 is not being utilized, "5" is set as the maximum descriptor number D.

Figure 10:
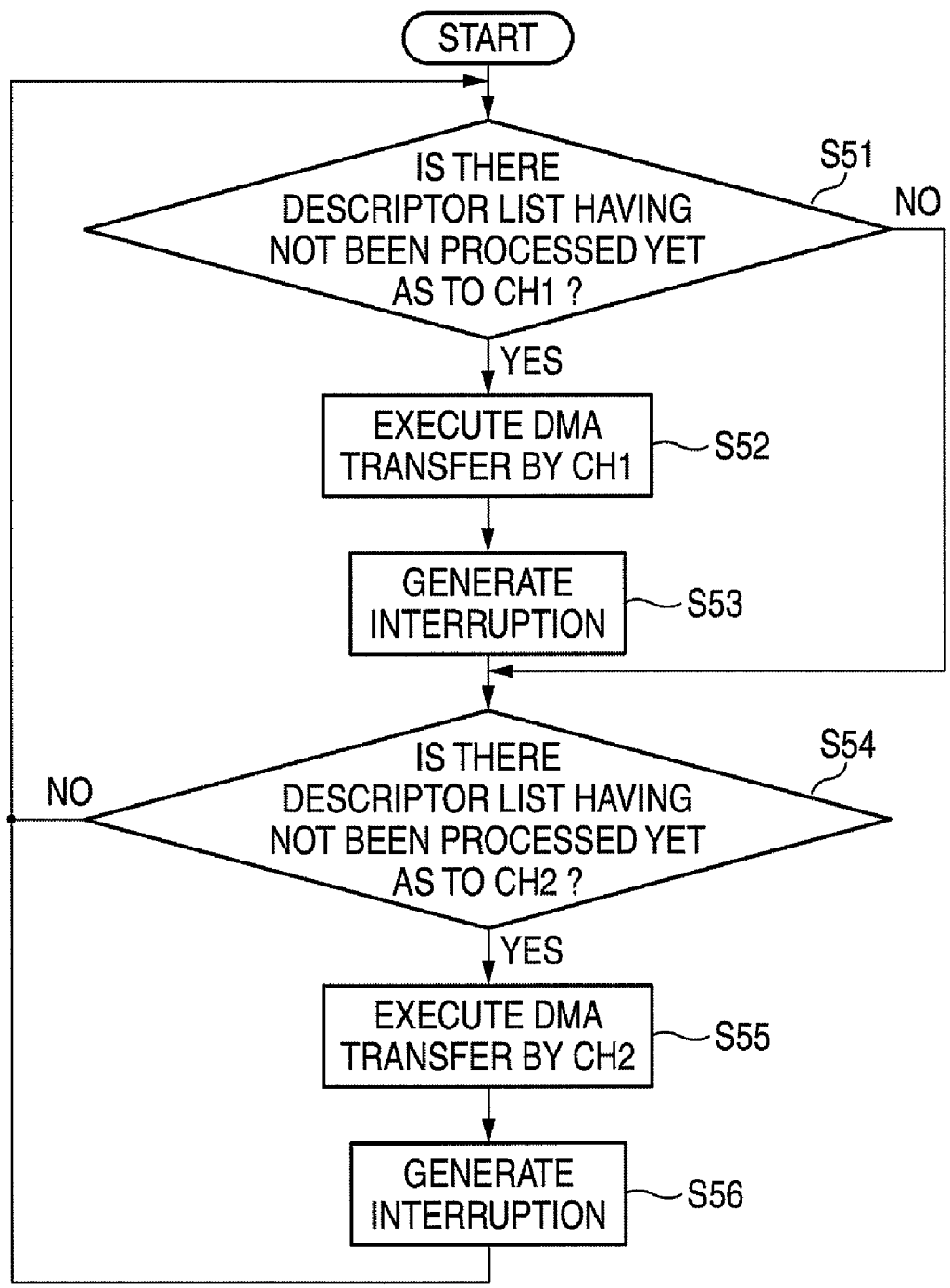
FIG. 10 is a flowchart showing an example of the first operation of the DMAC.

FIG. 10 is a flowchart showing an example of the first operation of the DMAC 80. In this example of the operation, each of the channels CH1 and CH2 occupies the transmission path on a descriptor list unit basis. Hereinafter, the example of the first operation of the DMAC 80 will be explained with reference to FIG. 10.

The DMAC 80 determines as to the channel CH1 whether or not there is the descriptor list having not been processed yet (S51). To be concrete, the DMAC 80 determines whether or not the descriptor list pointer is set for the channel CH1.

When it is determined that there is the descriptor list having not been processed yet (YES in S51), the DMAC 80 executes the DMA transfer by the channel CH1 based on this descriptor list (S52). Then, when the DMA transfer based on this descriptor list is completed, the DMAC 80 generates an interruption to the CPU 50 (S53) and proceeds the processing to a step S54.

In contrast, when it is determined that there is no descriptor list having not been processed yet (NO in S51), the DMAC 80 proceeds the processing to the step S54.

In the step S54, the DMAC 80 determines as to the channel CH2 whether or not there is the descriptor list having not been processed yet. To be concrete, the DMAC 80 determines whether or not the descriptor list pointer is set for the channel CH2.

When it is determined that there is the descriptor list having not been processed yet (YES in S54), the DMAC 80 executes the DMA transfer by the channel CH2 based on this descriptor list (S55). Then, when the DMA transfer based on this descriptor list is completed, the DMAC 80 generates an interruption to the CPU 50 (S56) and proceeds the processing to the step S51.

In contrast, when it is determined that there is no descriptor list having not been processed yet in the step S54 (NO in S54), the DMAC 80 proceeds the processing to the step S51.

Figure 11:
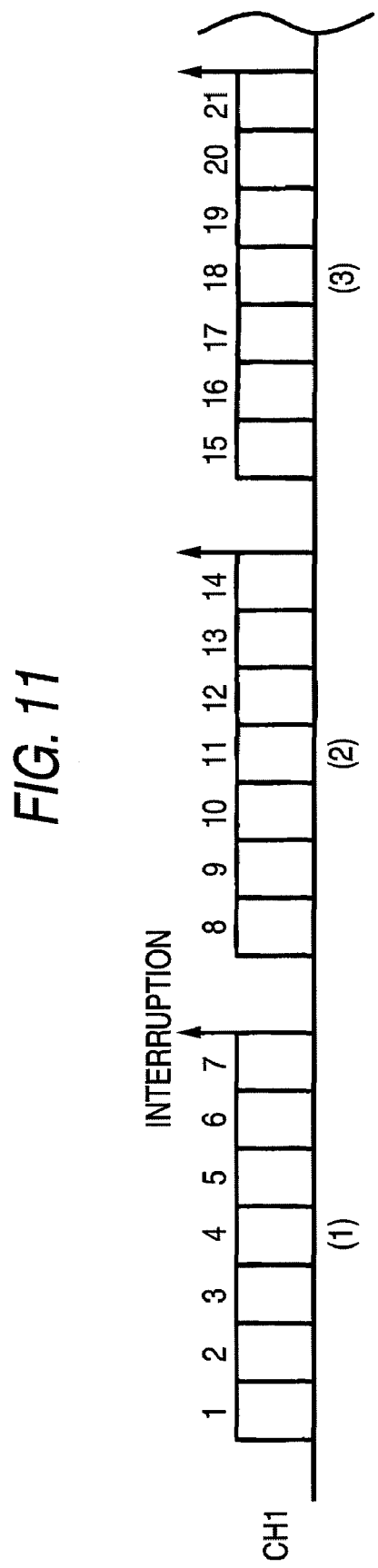
FIG. 11 is a sequential diagram showing an example of the operations of the channels CH1 and CH2 of the DMAC.
Figure 12:
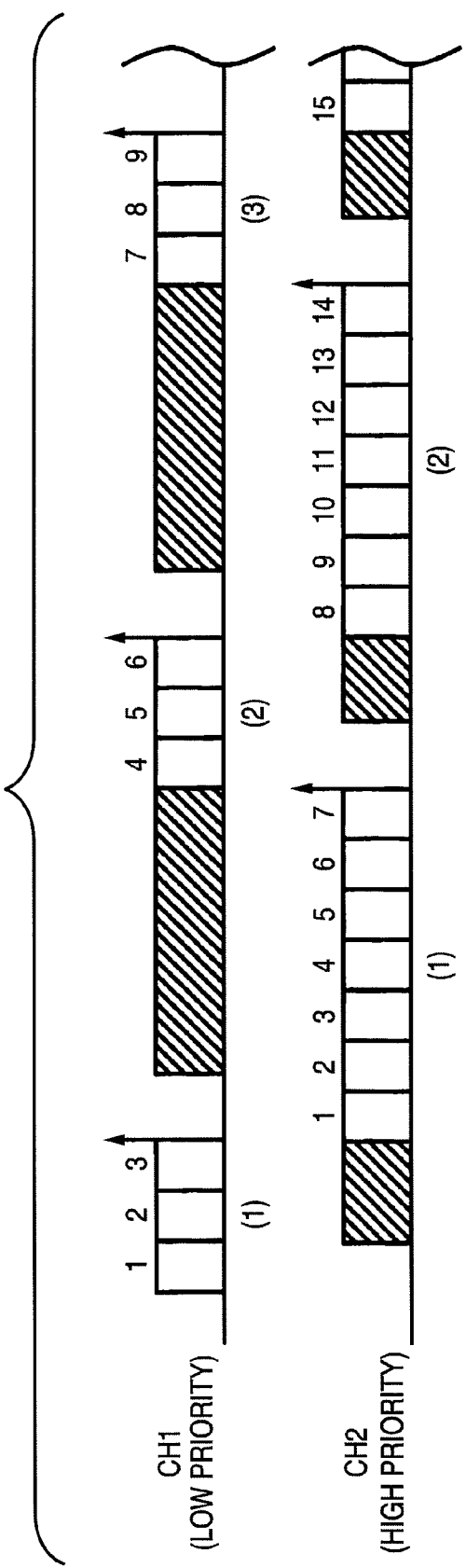
FIG. 12 is a sequential diagram showing an example of the operations of the channels CH1 and CH2 of the DMAC.

FIGS. 11 and 12 are sequential diagrams showing an example of the operations of the channels CH1 and CH2 of the DMAC 80. In this example, the DMAC 80 operates as shown in FIG. 10. The descriptor list for the channel CH1 is generated in accordance with the state of utilizing the channel CH2 as shown in FIG. 6. The descriptor list for the channel CH2 is generated irrespective of the state of utilizing the channel CH1 as shown in FIG. 7. As to the channel CH1, the maximum descriptor number D0 corresponding to the case where the channel CH2 is not being utilized is "7", whilst the maximum descriptor number D1 corresponding to the case where the channel CH2 is being utilized is "3". As to the channel CH2, the maximum descriptor number D is a constant value of "7".

According to one mode, the channel CH1 is utilized for a job of a low priority and the channel CH2 is utilized for a job of a high priority. As jobs utilizing the DMA transfer in a printing apparatus or a copying machine, there are a printing job, an image reading (scanning) job, an image conversion (rendering) job, a system management job etc. These jobs may be arranged in the order of the printing, the rendering and the system management or in the order of the scanning, the rendering and the system management, for example, when arranged in the order of higher priority. Thus, for example, the channel CH1 is utilized for the rendering of a low priority and the channel CH2 is utilized for the scanning of a high priority.

In FIGS. 11 and 12, the DMA transfer section based on each of the descriptors is represented by a rectangle. The descriptor numbers corresponding to the rectangles are represented on the upper sides of the rectangles, respectively. Numerals within parentheses represent the descriptor list numbers, respectively. The expression manner of these drawings will be applied to the following similar drawings.

In FIG. 11, only the channel CH1 operates to perform the DMA transfer based on a series of the descriptor lists. In this case, the descriptor number of each of the descriptor lists is "7". When the DMA transfer based on the descriptor list is completed, an interruption is generated. Then, upon the lapse of a vacant time such as an interruption processing time, the DMA transfer based on the next descriptor list is executed.

When only the channel CH2 operates, the operation similar to that of the aforesaid case where only the channel CH1 operates is performed.

In FIG. 12, the channels CH1 and CH2 operate in parallel and each of these channels performs the DMA transfer based on a series of the corresponding descriptor lists. In this case, the descriptor number of each of the descriptor lists of the channel CH1 is "3", whilst the descriptor number of each of the descriptor lists of the channel CH2 is "7". In each of the channels, when the DMA transfer based on the series of the descriptor lists is started, the transmission path is occupied until the DMA transfer is completed. Thus, while the DMA transfer is performed by one of these channels, the DMA transfer can not be performed by the other channel. Thus, there arises a waiting time at the other channel. In FIG. 12, the waiting time is represented by a hatched area. The DMA transfer of the other channel having been waited is started when the DMA transfer of the one channel is completed and an interruption is generated.

Figure 13:
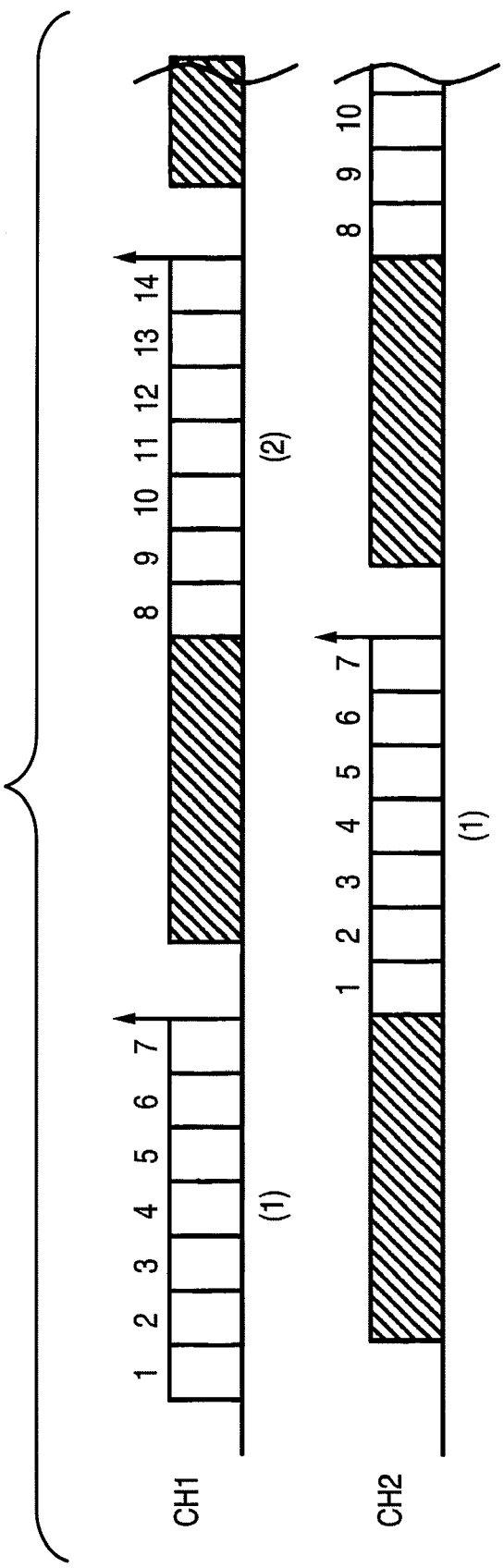
FIG. 13 is a sequential diagram showing a comparative example between the operations of the channels CH1 and CH2 of the DMAC.

FIG. 13 is a sequential diagram showing a comparative example between the operations of the channels CH1 and CH2 of the DMAC 80. This comparative example is same as FIG. 12 in the operation conditions of the DMAC 80 and the transfer instruction unit 30, but differs therefrom in a point that the descriptor list for the channel CH1 is generated in the manner of FIG. 7 like the channel CH2. That is, in this comparative example, the descriptor lists for the channels CH1 and CH2 are generated based on the maximum descriptor number of the constant value "7".

In FIG. 13, the channels CH1 and CH2 operate in parallel and each of these channels performs the DMA transfer based on a series of the corresponding descriptor lists. In this case, the descriptor number of the descriptor list of each of the channels CH1 and CH2 is "7".

In FIG. 13, the waiting time of the channel CH1 is almost same as the waiting time of the channel CH2. In contrast, in FIG. 12, the waiting time of the channel CH2 is shorter than the waiting time of the channel CH1. That is, the DMA transfer of the channel CH2 is set to have a higher priority than the DMA transfer of the channel CH1. Further, the waiting time of the channel CH2 in FIG. 12 is set to shorter than the waiting time of the channel CH2 in FIG. 13.

Figure 14:
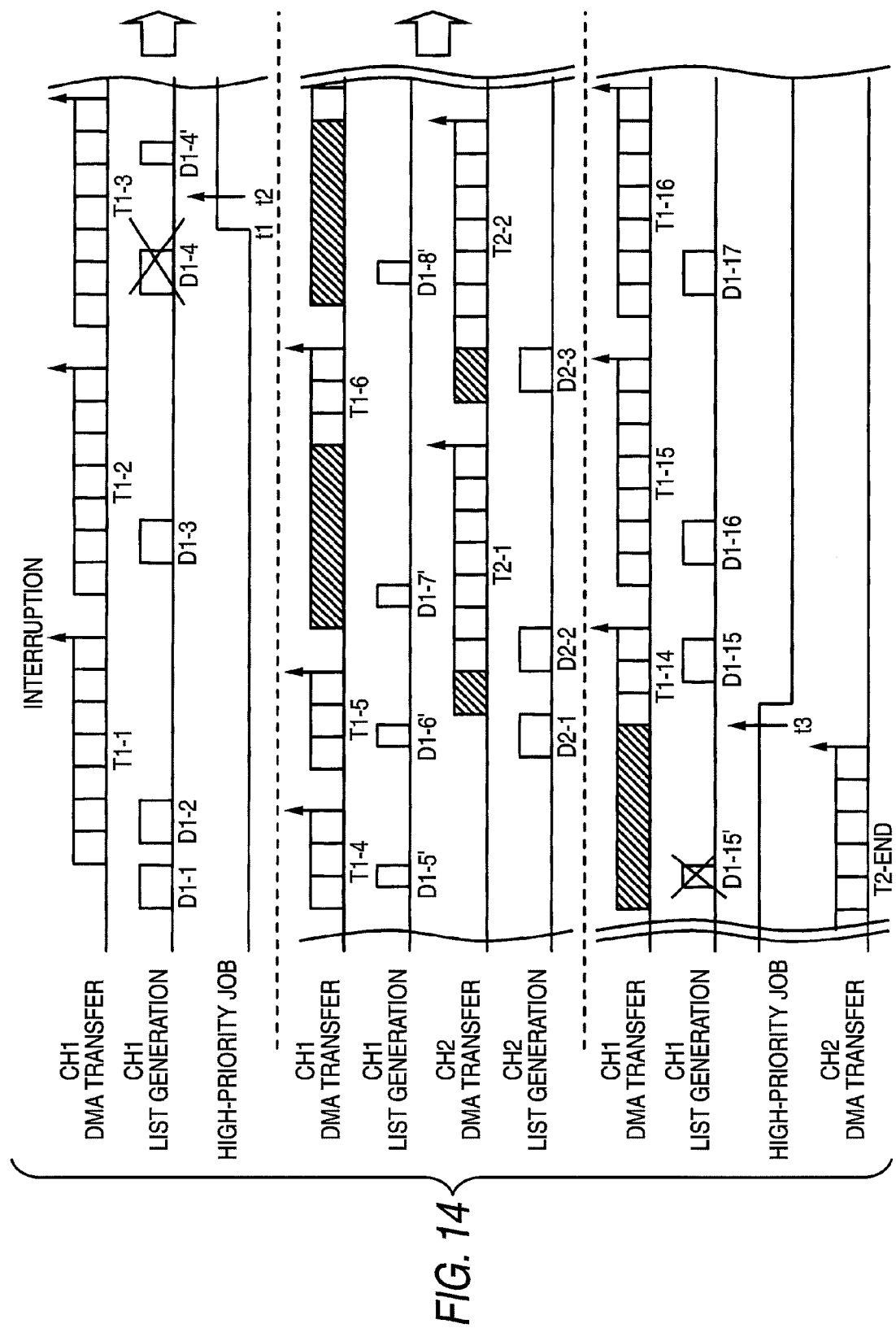
FIG. 14 is a sequential diagram showing an example of the operations of the channels CH1 and CH2 of the DMAC.

FIG. 14 is a sequential diagram showing an example of the operations of the channels CH1 and CH2 of the DMAC 80. In this example, the operation conditions of the DMAC 80 and the transfer instruction unit 30 are same as those of FIG. 12.

In FIG. 14, at first, only the channel CH1 utilized for the low-priority job operates. To be concrete, descriptor lists DL1-1 to DL1-4 for the channel CH1 are generated during generation sections D1-1 to D1-4, respectively. Then, the DMA transfer for the channel CH1 based on the descriptor lists DL1-1 to DL1-3 is performed at transfer sections T1-1 to T1-3, respectively. In this respect, the descriptor number of each of the descriptor lists DL1-1 to DL1-4 is "7".

After the generation section D1-4, the high-priority job utilizing the DMA transfer of the channel CH2 is started at a time point t1, and the start of this high-priority job is notified to the transfer instruction unit 30 at a time point t2. In response to the notification, the transfer instruction unit 30 discards the descriptor list DL1-4 which is generated at the generation section D1-4 and has not been transferred, and generates a new descriptor list DL1-4' having a descriptor number "3" at a generation section D1-4'. Hereinafter, descriptor lists DL1-5' to DL1-15' each having the descriptor number "3" are generated during generation sections D1-5' to D1-15', respectively. Then, the DMA transfer for the channel CH1 based on the descriptor lists DL1-4' to DL1-14' is performed at transfer sections T1-4 to T1-14, respectively.

In contrast, after the time point t2, the DMA transfer of the channel CH2 is performed in parallel to the DMA transfer of the channel CH1. To be concrete, descriptor lists DL2-1 to DL2-END for the channel CH2 are generated during generation sections D2-1 to D2-END (not shown), respectively. Then, the DMA transfer for the channel CH2 based on the descriptor lists DL2-1 to DL2-END is performed at transfer sections T2-1 to T2-END, respectively. In this respect, the descriptor number of each of the descriptor lists DL2-1 to DL2-END is "7".

During a time period where the DMA transfer of the channel CH2 and the DMA transfer of the channel CH1 are performed in parallel, there arise waiting times in each of the channels CH1 and CH2 as shown by hatched areas. In this case, the waiting time of the channel CH2 is shorter than the waiting time of the channel CH1.

After the transfer sections T2-END, the completion of the high-priority job is notified to the transfer instruction unit 30 at a time point t3 before the completion of the high-priority job. In response to the notification, the transfer instruction unit 30 discards the descriptor list DL1-15' which is generated at the generation section D1-15' and has not been transferred, and generates a new descriptor list DL1-15 having a descriptor number "7" at a generation section D1-15. Hereinafter, descriptor lists DL1-16, DL1-17 . . . each having the descriptor number "7" are generated during generation sections D1-16, D1-17 . . . respectively. Then, the DMA transfer for the channel CH1 based on the descriptor lists DL1-15, DL1-16 . . . is performed at transfer sections T1-15, T1-16 . . . respectively.

In the examples shown in FIGS. 11, 12 and 14, when the single job is operated, the DMA transfer is controlled so as to be performed with the descriptor number of the best efficiency. In contrast, when the high-priority job is executed, the descriptor number for the DMA transfer of the low-priority job is made small in order to shorten the waiting time of the DMA transfer for the high-priority job. In this respect, the descriptor number for the DMA transfer of the low-priority job (that is, the descriptor number to be adjusted) in the case of executing the high-priority job is set in a manner that the waiting time of the DMA transfer for the high-priority job is within an allowable waiting time of the DMA transfer for the high-priority job. To be concrete, the maximum descriptor number D1 for the channel CH2 is determined in advance in a manner that the waiting time of the DMA transfer for the high-priority job is equal to or smaller than the allowable waiting time.

Further, in the example of FIG. 14, at a time of starting the job utilizing the channel CH2, it is notified to the transfer instruction unit 30 that the job has been started. Then, the descriptor list of the channel CH1 is adjusted before starting the DMA transfer of the channel CH1. That is, as to the channel CH1, the descriptor lists having been generated are discarded and new descriptor lists are generated. Thus, the waiting time on the channel CH2 side can be reduced.

Figure 15:
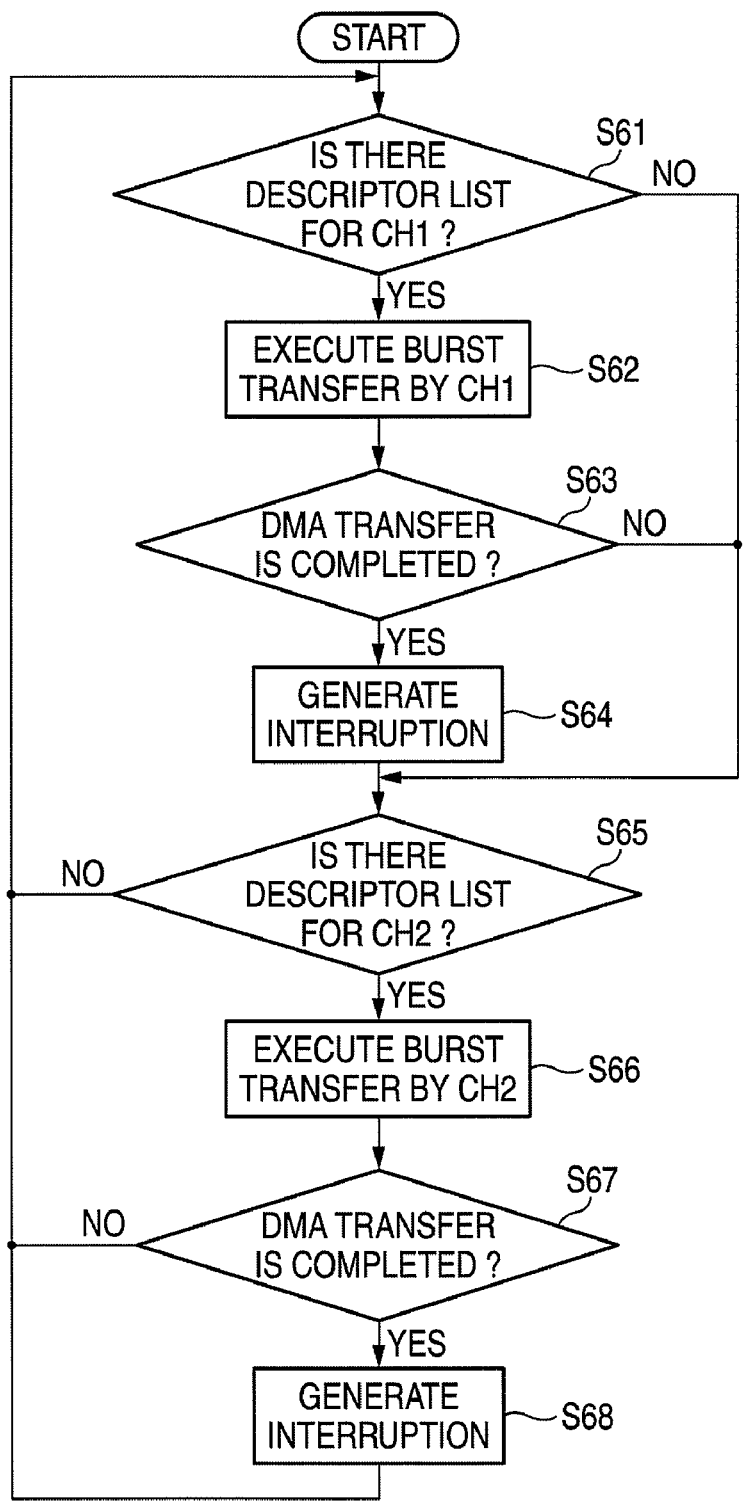
FIG. 15 is a flowchart showing an example of the second operation of the DMAC.

FIG. 15 is a flowchart showing an example of the second operation of the DMAC 80. In this example of the operation, the DMAC 80 executes the DMA transfer based on a single descriptor list in a manner of being divided into plural burst transfer. The transfer amount (that is, a burst length) of a single burst transfer is constant, for example. Further, the use of the transmission path of the channels CH1 and CH2 is controlled by the round-robin processing, and the channels CH1 and CH2 occupy the transmission path on a burst transfer unit basis. Hereinafter, the example of the second operation of the DMAC 80 will be explained with reference to FIG. 15.

The DMAC 80 determines as to the channel CH1 whether or not there is the descriptor list being processed or having not been processed yet (S61).

When it is determined that there is the descriptor list being processed or having not been processed yet (YES in S61), the DMAC 80 executes a single burst transfer by the channel CH1 (S62).

Then, the DMAC 80 determines whether or not the DMA transfer by the channel CH1 based on the descriptor list is completed (S63).

When it is determined that the DMA transfer is completed (YES in S63), the DMAC 80 generates an interruption to the CPU 50 (S64) and proceeds the processing to a step S65.

In contrast, when it is determined that there is no descriptor list being processed or having not been processed yet (NO in S61) or that the DMA transfer has not been completed yet in the step S63 (NO in S63), the DMAC 80 proceeds the processing to the step S65.

In the step S65, the DMAC 80 determines as to the channel CH2 whether or not there is the descriptor list being processed or having not been processed yet.

When it is determined that there is the descriptor list being processed or having not been processed yet (YES in S65), the DMAC 80 executes a single burst transfer by the channel CH2 (S66).

Then, the DMAC 80 determines whether or not the DMA transfer by the channel CH2 based on the descriptor list is completed (S67).

When it is determined that the DMA transfer is completed (YES in S67), the DMAC 80 generates an interruption to the CPU 50 (S68) and proceeds the processing to the step S61.

In contrast, when it is determined that there is no descriptor list being processed or having not been processed yet (NO in S65) or that the DMA transfer has not been completed yet in the step S67 (NO in S63), the DMAC 80 proceeds the processing to the step S61.

Figure 16:
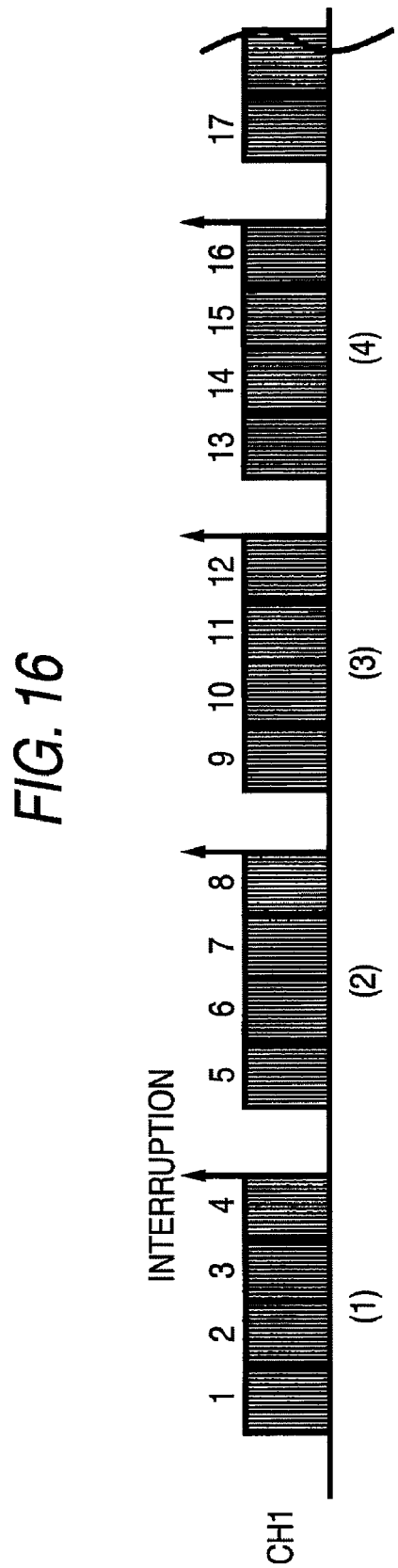
FIG. 16 is a sequential diagram showing an example of the operations of the channels CH1 and CH2 of the DMAC.
Figure 17:
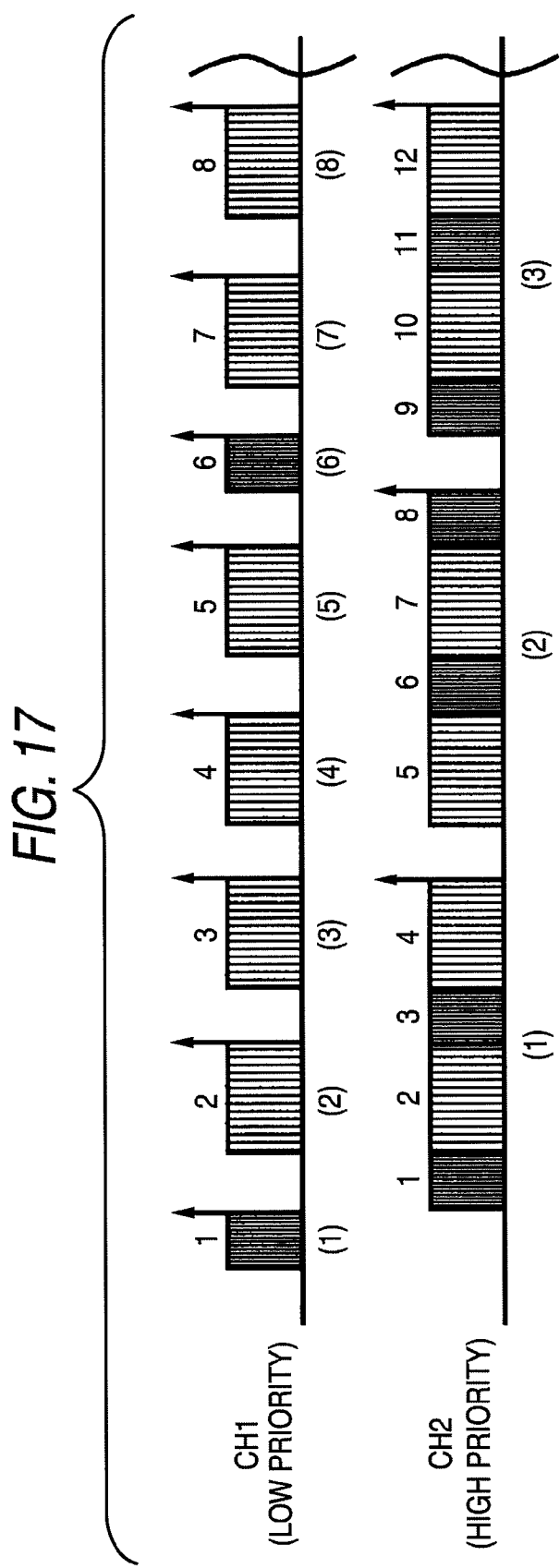
FIG. 17 is a sequential diagram showing an example of the operations of the channels CH1 and CH2 of the DMAC.

FIGS. 16 and 17 are sequential diagrams showing an example of the operations of the channels CH1 and CH2 of the DMAC 80. In this example, the DMAC 80 operates as shown in FIG. 15. The descriptor list for the channel CH1 is generated in accordance with the state of utilizing the channel CH2 as shown in FIG. 6. The descriptor list for the channel CH2 is generated irrespective of the state of utilizing the channel CH1 as shown in FIG. 7. As to the channel CH1, the maximum descriptor number D0 corresponding to the case where the channel CH2 is not being utilized is "4", whilst the maximum descriptor number D1 corresponding to the case where the channel CH2 is being utilized is "1". As to the channel CH2, the maximum descriptor number D is a constant value of "4".

According to one mode, the channel CH1 is utilized for a job of a low priority and the channel CH2 is utilized for a job of a high priority. For example, in the case of a copying machine, the channel CH1 is utilized for the rendering of a low priority and the channel CH2 is utilized for the scanning of a high priority.

In FIGS. 16 and 17, a hatched area of vertical lines in a rectangle representing the DMA transfer section based on the corresponding descriptor represents that plural burst transfer are performed. The hatched area of high-density vertical lines represents that the transmission path is occupied by a single channel and so the burst transfer is performed at a high frequency. In contrast, the hatched area of low-density vertical lines represents that the transmission path is occupied alternately by two channels on the burst transfer unit basis and so the burst transfer is performed at a low frequency. In the section of the hatched area of the low-density vertical lines, the execution section of the burst transfer and the waiting time are repeated alternately. The expression manner of these drawings will be applied to the following similar drawings.

In FIG. 16, only the channel CH1 operates to perform the DMA transfer based on a series of the descriptor lists. In this case, the descriptor number of each of the descriptor lists is "4". When only the channel CH2 operates, the operation similar to that of the aforesaid case where only the channel CH1 operates is performed.

In FIG. 17, the channels CH1 and CH2 operate in parallel and each of these channels performs the DMA transfer based on a series of the corresponding descriptor lists. In this case, the descriptor number of each of the descriptor lists of the channel CH1 is "1", whilst the descriptor number of each of the descriptor lists of the channel CH2 is "4". As shown in FIG. 17, the DMA transfer of the channel CH2 is performed at a low speed in the section where the DMA transfer of the channel CH2 is executed. This is because the right of use of the transmission path is alternately given to the channels CH1 and CH2. In contrast, in the section where the DMA transfer of the channel CH1 is not executed (for example, the vacant time of the channel CH1), the channel CH2 occupies the transmission path and so the DMA transfer of the channel CH2 is performed at a high speed.

Figure 18:
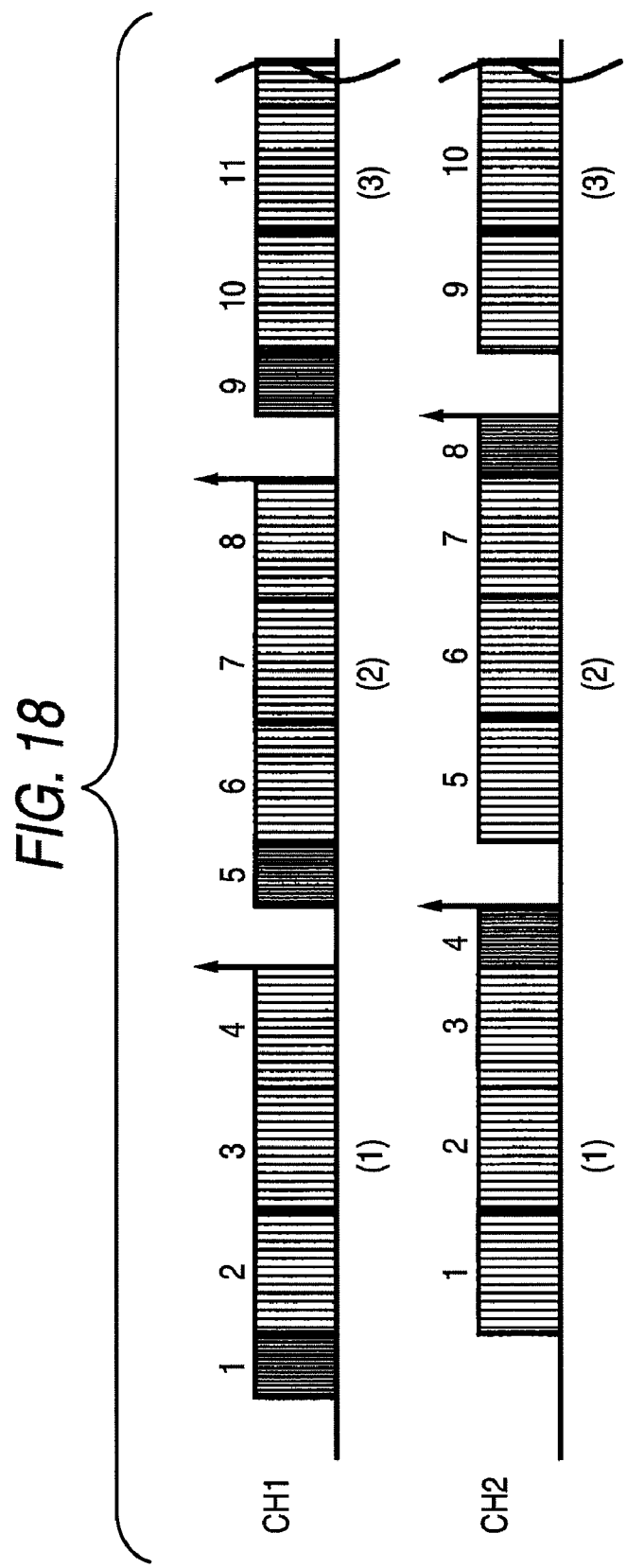
FIG. 18 is a sequential diagram showing a comparative example between the operations of the channels CH1 and CH2 of the DMAC.

FIG. 18 is a sequential diagram showing a comparative example between the operations of the channels CH1 and CH2 of the DMAC 80. This comparative example is same as FIG. 17 in the operation conditions of the DMAC 80 and the transfer instruction unit 30, but differs therefrom in a point that the descriptor list for the channel CH1 is generated in the manner of FIG. 7 like the channel CH2. That is, in this comparative example, the descriptor lists for the channels CH1 and CH2 are generated based on the maximum descriptor number of the constant value "4".

In FIG. 18, the channels CH1 and CH2 operate in parallel and each of these channels performs the DMA transfer based on a series of the corresponding descriptor lists. In this case, the descriptor number of the descriptor list of each of the channels CH1 and CH2 is "4".

In FIG. 18, the vacant time between the DMA transfer is generated at almost the same frequency as to each of the channels CH1 and CH2, and so the transfer amount per unit time is almost same between the channels CH1 and CH2. In contrast, in FIG. 17, the vacant time of the channel CH1 is generated at a frequency larger than that of the channel CH2. Thus, the DMA transfer is performed at a high speed more frequently on the channel CH2 side as compared with the channel CH1 side, and so the transfer amount per unit time is larger on the channel CH2 side as compared with the channel CH1 side. That is, the DMA transfer on the channel CH2 side is set to have a higher priority than that on the channel CH1 side.

Figure 19:
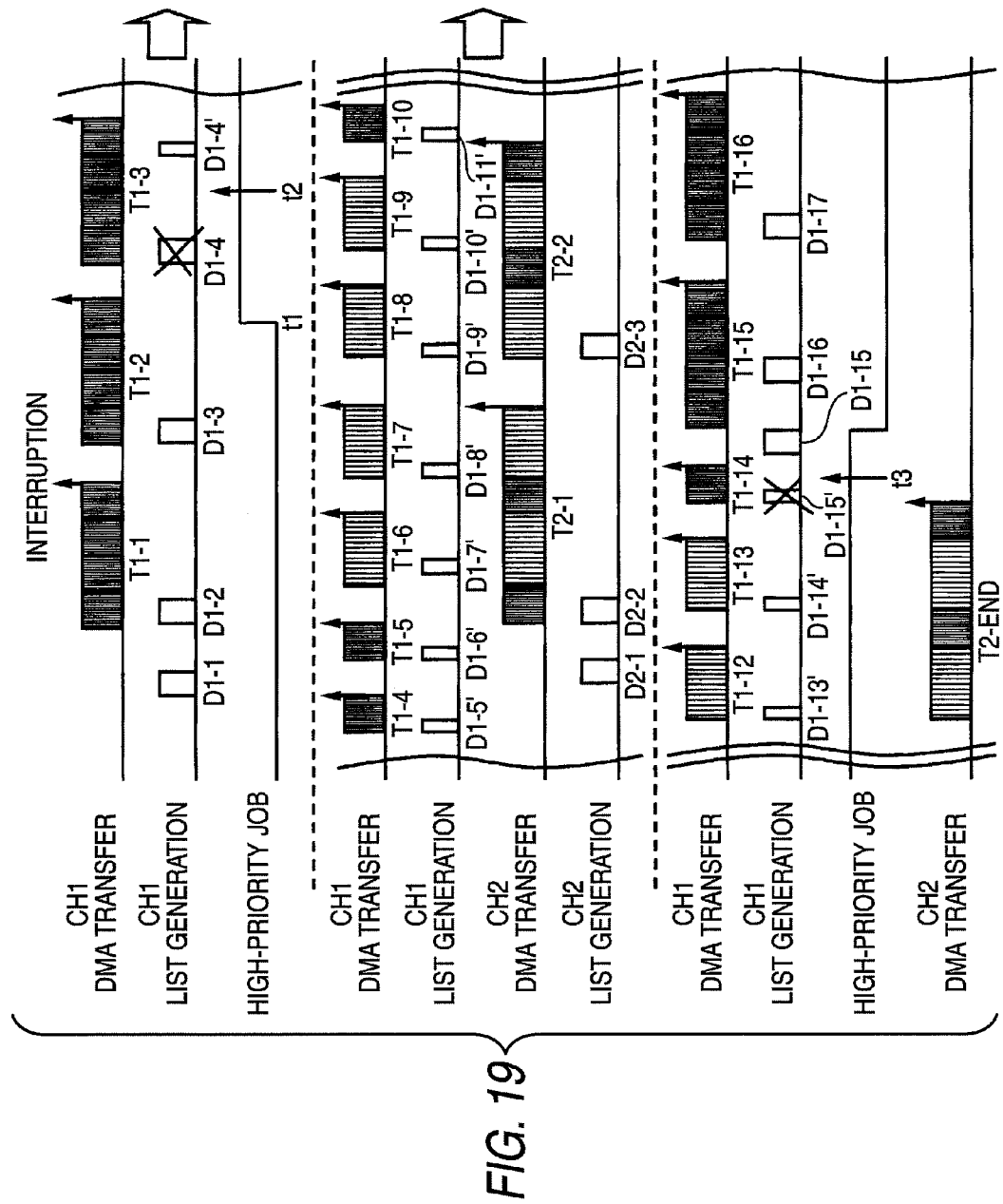
FIG. 19 is a sequential diagram showing an example of the operations of the channels CH1 and CH2 of the DMAC.

FIG. 19 is a sequential diagram showing an example of the operations of the channels CH1 and CH2 of the DMAC 80. In this example, the operation conditions of the DMAC 80 and the transfer instruction unit 30 are same as those of FIG. 17.

In FIG. 19, at first, only the channel CH1 utilized for the low-priority job operates. To be concrete, descriptor lists DL1-1 to DL1-4 for the channel CH1 are generated during generation sections D1-1 to D1-4, respectively. Then, the DMA transfer for the channel CH1 based on the descriptor lists DL1-1 to DL1-3 is performed at transfer sections T1-1 to T1-3, respectively. In this respect, the descriptor number of each of the descriptor lists DL1-1 to DL1-4 is "4".

The high-priority job utilizing the DMA transfer of the channel CH2 is started at a time point t1, and the start of this high-priority job is notified to the transfer instruction unit 30 at a time point t2. In response to the notification, the transfer instruction unit 30 discards the descriptor list DL1-4 which is generated at the generation section D1-4 and has not been transferred, and generates a new descriptor list DL1-4' having a descriptor number "1" at a generation section D1-4'. Hereinafter, descriptor lists DL1-5' to DL1-15' each having the descriptor number "1" are generated during generation sections D1-5' to D1-15', respectively. Then, the DMA transfer for the channel CH1 based on the descriptor lists DL1-4' to DL1-14' is performed at transfer sections T1-4 to T1-14, respectively.

In contrast, after the time point t2, the DMA transfer of the channel CH2 is performed in parallel to the DMA transfer of the channel CH1. To be concrete, descriptor lists DL2-1 to DL2-END for the channel CH2 are generated during generation sections D2-1 to D2-END (not shown), respectively. Then, the DMA transfer for the channel CH2 based on the descriptor lists DL2-1 to DL2-END is performed at transfer sections T2-1 to T2-END, respectively. In this respect, the descriptor number of each of the descriptor lists DL2-1 to DL2-END is "4".

After the transfer sections T2-END, the completion of the high-priority job is notified to the transfer instruction unit 30 at a time point t3 before the completion of the high-priority job.

In response to the notification, the transfer instruction unit 30 discards the descriptor list DL1-15' which is generated at the generation section D1-15' and has not been transferred, and generates a new descriptor list DL1-15 having a descriptor number "4" at a generation section D1-15. Hereinafter, descriptor lists DL1-16, DL1-17 . . . each having the descriptor number "4" are generated during generation sections D1-16, D1-17 . . . respectively. Then, the DMA transfer for the channel CH1 based on the descriptor lists DL1-15, DL1-16 . . . is performed at transfer sections T1-15, T1-16 . . . respectively.

Figure 20:
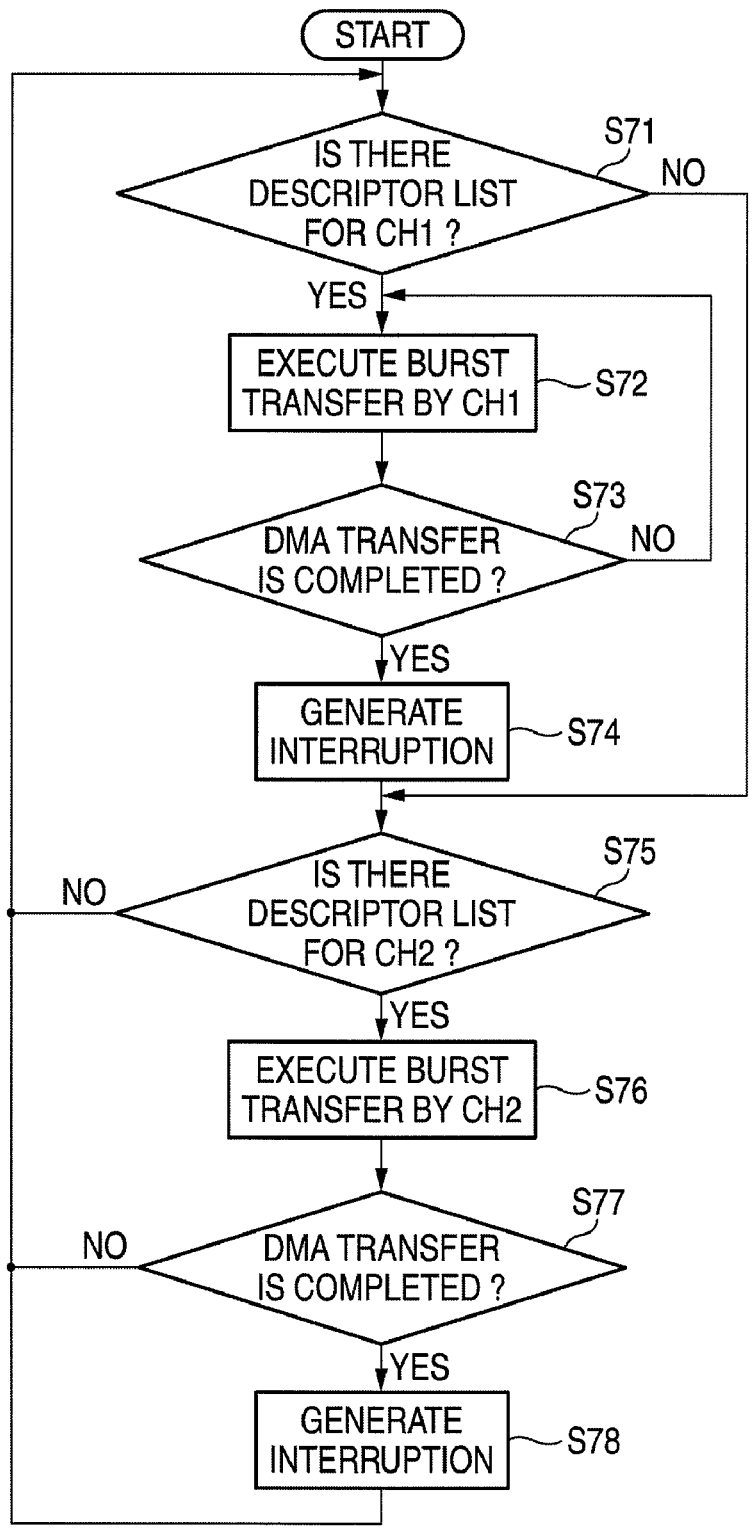
FIG. 20 is a flowchart showing an example of the third operation of the DMAC.

FIG. 20 is a flowchart showing an example of the third operation of the DMAC 80. In this example of the operation, the DMAC 80 executes the DMA transfer based on a single descriptor list in a manner of being divided into plural burst transfers. The usage of the transmission path by the channels CH1 and CH2 is controlled by the fixed priority order method so that the channel CH1 is set to have a higher priority than the channel CH2. The channel CH1 as a high-priority channel occupies the transmission path on a descriptor list unit basis and the channel CH2 as a low-priority channel occupies the transmission path on the burst transfer unit basis. Hereinafter, the example of the third operation of the DMAC 80 will be explained with reference to FIG. 20.

The DMAC 80 determines as to the channel CH1 whether or not there is the descriptor list having not been processed yet (S71).

When it is determined that there is the descriptor list having not been processed yet (YES in S71), the DMAC 80 executes a single burst transfer by the channel CH1 (S72)

Then, the DMAC 80 determines whether or not the DMA transfer by the channel CH1 based on the descriptor list is completed (S73).

When it is determined that the DMA transfer is not completed yet (NO in S73), the DMAC 80 returns the processing to the step S72 and performs the burst transfer repeatedly.

In contrast, when it is determined that the DMA transfer is completed (YES in S73), the DMAC 80 generates an interruption to the CPU 50 (S74) and proceeds the processing to a step S75.

When it is determined that there is no descriptor list having not been processed yet (NO in S71), the DMAC 80 proceeds the processing to the step S75.

In the step S75, the DMAC 80 determines as to the channel CH2 whether or not there is the descriptor list being processed or having not been processed yet.

When it is determined that there is the descriptor list being processed or having not been processed yet (YES in S75), the DMAC 80 executes a single burst transfer by the channel CH2 (S76).

Then, the DMAC 80 determines whether or not the DMA transfer by the channel CH2 based on the descriptor list is completed (S77).

When it is determined that the DMA transfer is completed (YES in S77), the DMAC 80 generates an interruption to the CPU 50 (S78) and proceeds the processing to the step S71.

In contrast, when it is determined that there is no descriptor list being processed or having not been processed yet (NO in S75) or that the DMA transfer has not been completed yet in the step S77 (NO in S77), the DMAC 80 proceeds the processing to the step S71.

Figure 21:
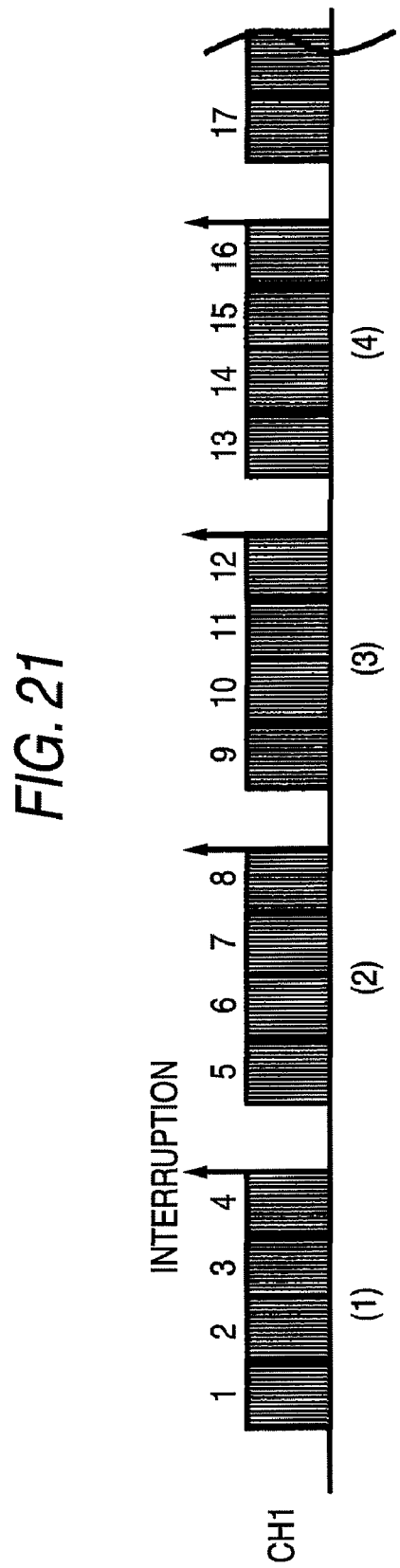
FIG. 21 is a sequential diagram showing an example of the operations of the channels CH1 and CH2 of the DMAC.
Figure 22:
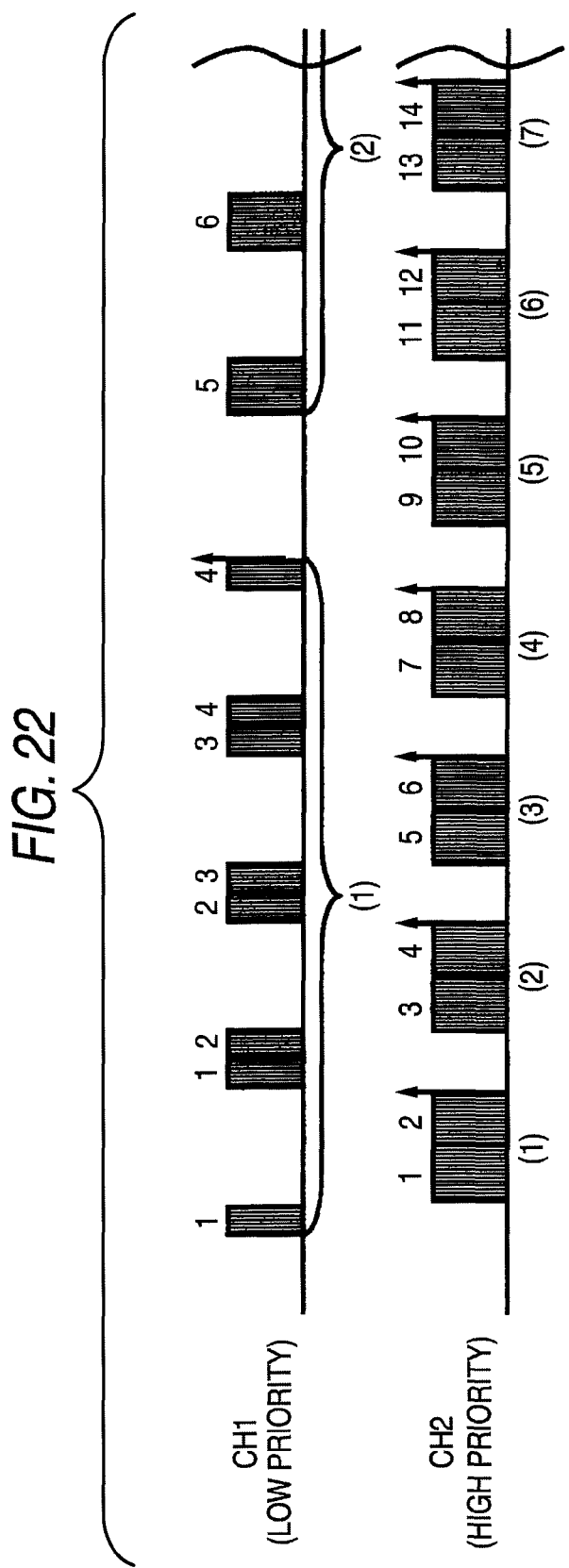
FIG. 22 is a sequential diagram showing an example of the operations of the channels CH1 and CH2 of the DMAC.

FIGS. 21 and 22 are sequential diagrams showing an example of the operations of the channels CH1 and CH2 of the DMAC 80. In this example, the DMAC 80 operates as shown in FIG. 20. The descriptor list for the channel CH1 is generated in accordance with the state of utilizing the channel CH2 as shown in FIG. 6. The descriptor list for the channel CH2 is generated irrespective of the state of utilizing the channel CH1 as shown in FIG. 7. As to the channel CH1, the maximum descriptor number D0 corresponding to the case where the channel CH2 is not being utilized is "4", whilst the maximum descriptor number D1 corresponding to the case where the channel CH2 is being utilized is "2". As to the channel CH2, the maximum descriptor number D is a constant value of "4".

According to one mode, the channel CH1 of a high priority is utilized for a job of a high priority and the channel CH2 of a low priority is utilized for a job of a low priority. For example, the channel CH1 is utilized for the scanning of a high priority and the channel CH2 is utilized for the rendering of a low priority.

In FIG. 21, only the channel CH1 operates to perform the DMA transfer based on a series of the descriptor lists. In this case, the descriptor number of each of the descriptor lists is "4". When only the channel CH2 operates, the operation similar to that of the aforesaid case where only the channel CH1 operates is performed.

In FIG. 22, the channels CH1 and CH2 operate in parallel and each of these channels performs the DMA transfer based on a series of the corresponding descriptor lists. In this case, the descriptor number of each of the descriptor lists of the channel CH1 is "2", whilst the descriptor number of each of the descriptor lists of the channel CH2 is "4".

Figure 23:
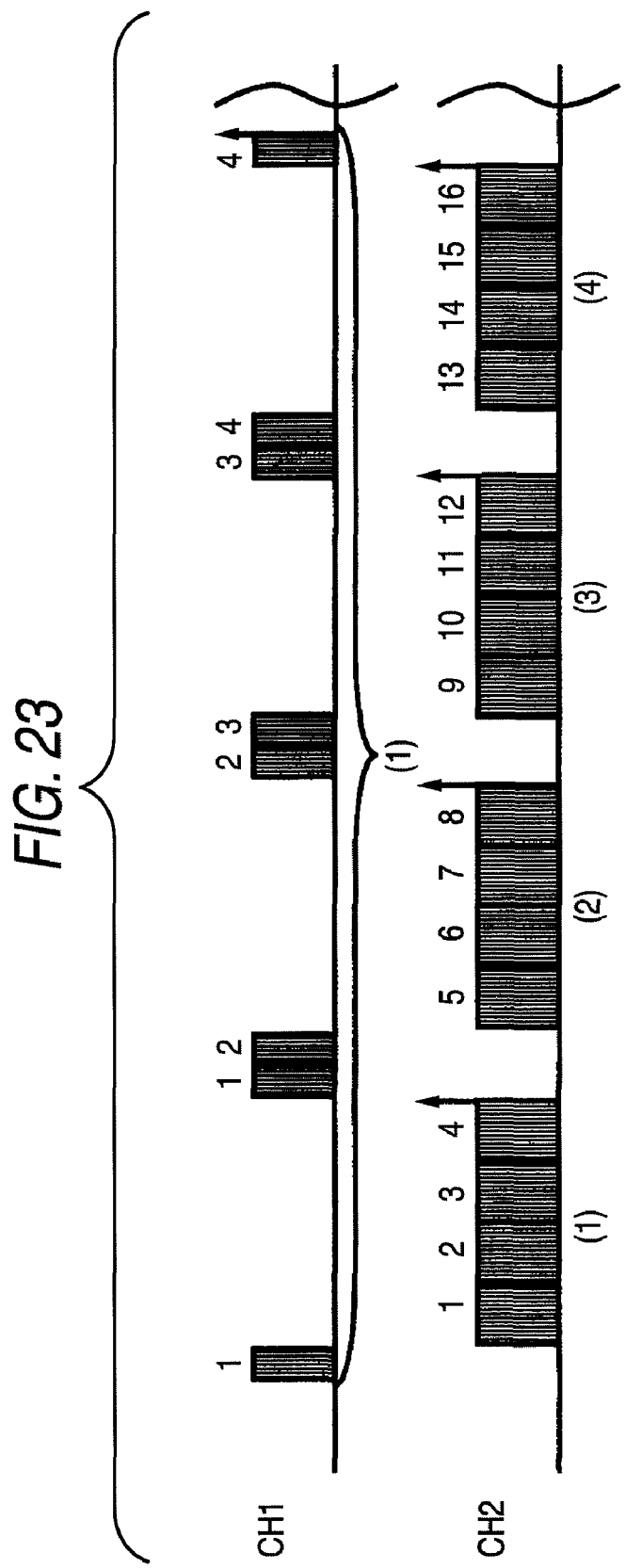
FIG. 23 is a sequential diagram showing a comparative example between the operations of the channels CH1 and CH2 of the DMAC.

FIG. 23 is a sequential diagram showing a comparative example between the operations of the channels CH1 and CH2 of the DMAC 80. This comparative example is same as FIG. 21 in the operation conditions of the DMAC 80 and the transfer instruction unit 30, but differs therefrom in a point that the descriptor list for the channel CH1 is generated in the manner of FIG. 7 like the channel CH2. That is, in this comparative example, the descriptor lists for the channels CH1 and CH2 are generated based on the maximum descriptor number of the constant value "4".

In FIG. 23, the channels CH1 and CH2 operate in parallel and each of these channels performs the DMA transfer based on a series of the corresponding descriptor lists. In this case, the descriptor number of the descriptor list of each of the channels CH1 and CH2 is "4".

In FIGS. 22 and 23, the DMA transfer by the channel CH2 is performed during the vacant time on the channel CH1 side. In FIG. 23, the vacant time is generated at a relatively low frequency on the channel CH1 side. Thus, the DMA transfer of the channel CH2 is performed at a low frequency and so the transfer amount per unit time of the channel CH2 is reduced quietly. In contrast, in FIG. 22, the vacant time on the channel CH1 side is generated at a higher frequency than the case of FIG. 23, and so the DMA transfer of the channel CH2 is performed more frequently. Thus, the reduction degree of the transfer amount per unit time of the channel CH2 is suppressed. The number of the descriptor on the channel CH1 side is set so as to secure a band width necessary on the channel CH2 side, for example.

FIG. 24 is a diagram showing an example of the configuration of an image processing system 100 including the DMA control system according to the exemplary embodiment.

The image processing system 100 includes an information processing unit 113 having a mother board 112 and a controller board 114, an image input unit 116, an image output unit 118, a controller 120 and an LCD (liquid crystal display) 122.

The mother board 112 includes a CPU 124 and a memory 128 serving as a main storage. The CPU 124 is coupled to the memory 128 by a dedicated bus via a hub 126. The memory 128 includes an area for storing image data outputted from (printed by) the image output unit 118 and image data read by the image input unit 116. The image data is DMA-transferred between the memory and a memory 144 provided at the controller board 114 described later without intervening the CPU 124.

The hub 126 is coupled to an LCD 122 provided outside of the mother board 112. The LCD 122 is a liquid crystal display device having a touch panel on the display surface thereof and acts as an interface.

The hub 126 for coupling the dedicated bus is coupled to a hub 130 for coupling a general-purpose bus. The hub 130 is coupled to a HDD (hard disc drive) 132 and an I/O port 134 via general-purpose buses. The HDD 132 stores a program executed by the CPU 124 and various kinds of data. The I/O port 134 acts as an input/output interface and is coupled to peripheral devices etc. of the image processing system 100.

A recording medium for recording a program executed by the CPU 124 and various kinds of data is not limited to the HDD, but may be a not-shown CD-ROM, a DVD disc, a magneto-optical disc, an IC card or a ROM etc. and also may be a transmission medium such as a transfer wave on an telecommunication line.

The mother board 112 is provided with an interface 136 for the general-purpose bus which is coupled to an interface 138 for the general-purpose bus provided at the controller board 114.

The controller board 114 includes a bus bridge 140, a memory 144, a logical circuit 146, a CPU 148 and an image processing circuit 150. The bus bridge 140, the memory 144, the CPU 148 and the image processing circuit 150 are coupled to a logical circuit 146 to thereby transmit/receive data therebetween via the logical circuit 146. Although the logical circuit 146 is a circuit programmed as a data transfer circuit, the logical circuit merely receives/transmits data but does not control the data transfer. The image processing circuit 150 is a circuit for subjecting an inputted image data to a predetermined image processing.

The bus bridge 140 is coupled to the interface 138 and also coupled to the logical circuit 146 via the general-purpose bus. The bus bridge 140 has a bridge function between the general-purpose buses and a bus master function. The bus master function is a function for transmitting/receiving data between the memory 144 and the image processing circuit 150 without intervening the CPU 148 on the controller board 114. To be concrete, on the controller board 114, image data is DMA-transferred to the image processing circuit 150 from the memory 144 via the logical circuit 146 at the time outputting an image by the image output unit 118. In contrast, when an image is read by the image input unit 116, image data thus obtained by reading the image is DMA-transferred to the memory 144 from the image processing circuit 150 via the logical circuit 146.

On the other hand, a DMA function for transferring data between the memory 128 on the mother board 112 and the memory 144 on the controller board 114 without intervening the CPU 124 on the mother board 112 is realized by a DMAC 142 provided at the bus bridge 140 separately from the bus master function of the bus bridge 140. The DMAC 142 is a circuit having a scatter-gather function capable of continuously transferring data with respect to discrete addresses.

A connector 152 provided at the controller board 114 is coupled to a connector 156 provided at the controller 120 having a control function for controlling the image input unit 116 and the image output unit 118. Further, the connector 152 of the controller board 114 is coupled to the aforesaid image processing circuit 150. The image data subjected to the image processing at the image processing circuit 150 is transmitted/received via the connector 152 and the connector 156.

Further, the controller board 114 is provided with another connector 154 provided separately from the connector 152. The connector 154 is directly coupled to the logical circuit 146 and also coupled to a connector 158 provided at the controller 120. The transmission/reception of control data and messages between the controller 120 and the controller board 114 is performed via these connector 154 and 158.

In the aforesaid configuration, the DMAC 142 has plural channels and acts as plural the DMA control units 10 and the control unit 20. Further, the CPU 124 acts as the transfer instruction unit 30 and the transfer request unit 40. The respective channels of the DMAC 142 are allocated to various kinds of jobs of the image processing system 100. That is, each of the various kinds of jobs performs the DMA transfer by using the channel corresponding to the job. According to the DMA transfer, information is transferred from the memory 128 to the memory 144 or from the memory 144 to the memory 128.

The invention is not limited to the aforesaid exemplary embodiment and may be changed in various manners in a range not departing from the gist of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A direct memory access (DMA) control system, comprising:
a plurality of DMA control units controlled in a manner that, while one of the plurality of DMA control units uses a transmission path, the other DMA control units other than the one of the plurality of DMA control units are prevented from using the transmission path; and
a transfer instruction unit that receives a request for DMA transfer with respect to a first DMA control unit from among the plurality of DMA control units, and determines, in response to receiving the request, a transfer amount for the first DMA control unit in accordance with a utilization state of a second DMA control unit from among the plurality of the DMA control units, and generates a transfer instruction to be sent to the first DMA control unit, the transfer instruction including the determined transfer amount for the first DMA control unit,
wherein if it is determined that the second DMA control unit is not utilized based on the utilization state the transfer instruction unit, in response to detecting a start of utilizing the second DMA control unit after generating the transfer instruction to be sent and before sending the transfer instruction to the first DMA control unit, (i) discards the transfer instruction to be sent to the first DMA control unit, (ii) determines a new transfer amount for the first DMA control unit according to a case where the second DMA control unit is being utilized, and sends a new transfer instruction including the determined new transfer amount to the first DMA control unit.

2. The DMA control system according to claim 1, wherein if it is determined that the second DMA control unit is utilized based on the utilization state, the transfer instruction unit, in response to detecting an end of utilizing the second DMA control unit after generating the transfer instruction to be sent and before sending the transfer instruction to the first DMA control unit, (i) discards the transfer instruction to be sent to the first DMA control unit, (ii) determines a new transfer amount for the first DMA control unit according to a case where the second DMA control unit is not being utilized, and sends a new transfer instruction including the determined new transfer amount to the first DMA control unit.

3. The DMA control system according to claim 1, wherein in the determination of the transfer amount by the transfer instruction unit, the transfer instruction unit determines the transfer amount for the first DMA control unit in accordance with a combination of utilization states respectively corresponding to DMA control units other than the first DMA control unit, and in the generation of the transfer instruction by the transfer instruction unit, the transfer instruction unit includes the transfer amount determined in accordance with the combination of utilization states respectively corresponding to DMA control units other than the first DMA control unit in the transfer instruction to be sent to the first DMA control unit.

4. The DMA control system according to claim 3, wherein the transfer instruction unit, in response to detecting a change of the combination after generating the transfer instruction to be sent and before sending the transfer instruction to the first DMA control unit, (i) discards the generated transfer instruction to be sent to the first DMA control unit, and (ii) determines a new transfer amount for the first DMA control unit in accordance with the detected change of the combination and sends a new transfer instruction including the determined new transfer amount to the first DMA control unit.

5. A printing apparatus comprising:
a plurality of direct memory access (DMA) control units controlled in a manner that, while one of the plurality of DMA control units uses a transmission path, the other DMA control units other than the one of the plurality of DMA control units are prevented from using the transmission path; and
a transfer instruction unit that receives a request for DMA transfer with respect to a first DMA control unit from among the plurality of DMA control units, and determines, in response to receiving the request, a transfer amount for the first DMA control unit in accordance with a utilization state of a second DMA control unit from among the plurality of the DMA control units, and generates a transfer instruction to be sent to the first DMA control unit, the transfer instruction including the determined transfer amount for the first DMA control unit, and
the transfer instruction to be sent to the first DMA control unit is an instruction to perform a DMA transfer of image information for an image reading, a printing or a conversion of the image information,
wherein if it is determined that the second DMA control unit is not utilized based on the utilization state, the transfer instruction unit, in response to detecting a start of utilizing the second DMA control unit after generating the transfer instruction to be sent and before sending the transfer instruction to the first DMA control unit, (i) discards the transfer instruction to be sent to the first DMA control unit, (ii) determines a new transfer amount for the first DMA control unit according to a case where the second DMA control unit is being utilized, and sends a new transfer instruction including the determined new transfer amount to the first DMA control unit.

6. A transfer instruction method comprising:
controlling a plurality of direct memory access (DMA) control units in a manner that, while one of the plurality of DMA control units uses a transmission path, the other DMA control units other than the one of the plurality of DMA control units are prevented from using the transmission path;
receiving a request for DMA transfer with respect to a first DMA control unit from among the plurality of DMA control units;
determining, in response to receiving the request, a transfer amount for the first DMA control unit in accordance with a utilization state of a second DMA control unit from among the plurality of the DMA control units; and
generating a transfer instruction to be sent to the first DMA control unit, the transfer instruction including the determined transfer amount for the first DMA control unit,
wherein if it is determined that the second DMA control unit is not utilized based on the utilization state and the transfer amount is determined based on the second DMA control unit not being utilized, the transfer instruction method further comprises:
detecting, after generating the transfer instruction to be sent and before sending the transfer instruction to the first DMA control unit, whether a utilization of the second DMA control unit has started; and
in response to detecting the start of utilization of the second DMA control unit, (i) discarding the transfer instruction to be sent to the first DMA control unit, (ii) determining a new transfer amount for the first DMA control unit according to a case where the second DMA control unit is being utilized, and sending a new transfer instruction including the determined new transfer amount to the first DMA control unit.

7. A non-transitory computer readable medium storing a program which when executed causes a computer to execute a process for transfer instructions, the process comprising:
controlling a plurality of direct memory access (DMA) control units in a manner that, while one of the plurality of DMA control units uses a transmission path, the other DMA control units other than the one of the plurality of DMA control units are prevented from using the transmission path;
receiving a request for DMA transfer with respect to a first DMA control unit from among the plurality of DMA control units;
determining, in response to receiving the request, a transfer amount for the first DMA control unit in accordance with a utilization state of a second DMA control unit from among the plurality of the DMA control units; and
generating a transfer instruction to be sent to the first DMA control unit, the transfer instruction including the determined transfer amount for the first DMA control unit,
wherein if it is determined that the second DMA control unit is not utilized based on the utilization state and the transfer amount is determined based on the second DMA control unit not being utilized, the process further comprises:
detecting, after generating the transfer instruction to be sent and before sending the transfer instruction to the first DMA control unit, whether a utilization of the second DMA control unit has started; and
in response to detecting the start of utilization of the second DMA control unit, (i) discarding the transfer instruction to be sent to the first DMA control unit, (ii) determining a new transfer amount for the first DMA control unit according to a case where the second DMA control unit is being utilized, and sending a new transfer instruction including the determined new transfer amount to the first DMA control unit.

* * * * *